(12) United States Patent
Gershon

(10) Patent No.: US 8,370,234 B2
(45) Date of Patent: Feb. 5, 2013

(54) DEVICE, SYSTEM, AND METHOD OF GENERATING A CUSTOMIZED TRADE ARTICLE

(75) Inventor: David Gershon, Tel Aviv (IL)

(73) Assignee: Super Derivatives, Inc., New York, NY (US)

( * ) Notice: Subject to any disclaimer, the term of this patent is extended or adjusted under 35 U.S.C. 154(b) by 894 days.

(21) Appl. No.: 12/357,463

(22) Filed: Jan. 22, 2009

(65) Prior Publication Data
US 2009/0307123 A1    Dec. 10, 2009

Related U.S. Application Data

(60) Provisional application No. 61/006,582, filed on Jan. 23, 2008.

(51) Int. Cl.
*G06Q 40/00* (2012.01)
(52) U.S. Cl. .......................................................... 705/35
(58) Field of Classification Search ............... 705/35–45
See application file for complete search history.

(56) References Cited

U.S. PATENT DOCUMENTS

| 7,167,844 B1 | 1/2007 | Leong et al. |
| 2003/0033240 A1 | 2/2003 | Balson et al. |
| 2008/0120129 A1* | 5/2008 | Seubert et al. .................... 705/1 |

OTHER PUBLICATIONS

International Search Report and Written Opinion for PCT/IL09/00090 mailed on May 5, 2009.

* cited by examiner

*Primary Examiner* — Richard C Weisberger
(74) *Attorney, Agent, or Firm* — Shichrur & Co.

(57) ABSTRACT

Some embodiments include devices, systems and/or methods of generating a customized trade article. In one embodiment, a trade-article generator application is to receive trade information including a plurality of values of one or more trade-related parameters defining at least one trade with respect to at least one financial instrument, and to automatically generate a customized electronic trade article corresponding to the trade based on a predefined trade-article layout. Other embodiments are described and claimed.

31 Claims, 34 Drawing Sheets

DEVICE, SYSTEM, AND METHOD OF GENERATING A CUSTOMIZED TRADE ARTICLE

CROSS REFERENCE

This application claims the benefit of and priority from U.S. Provisional Patent application 61/006,582, entitled "Device, system and method of generating a customized trade article", filed Jan. 23, 2008, the entire disclosure of which is incorporated herein by reference.

FIELD

Some embodiments relate generally to the field of financial instruments and, more particularly, to generating a trade article corresponding to at least one trade of at least one financial instrument.

BACKGROUND

Financial instruments can be categorized by form depending, for example, on whether they are cash instruments or derivative instruments. Cash instruments are financial instruments whose value is determined directly by markets. Derivative instruments are financial instruments, which derive their value from some other financial instrument or variable. Financial instruments can also be divided into exchange-traded derivatives and over-the-counter (OTC) derivatives.

Sales and trading of financial instruments are often the most profitable area of investment banking, responsible for the majority of revenue for many financial institutions such as banks or brokers.

In the process of market making, 'traders' (trading desk) will buy and sell financial products with the goal of making an incremental amount of money on each trade.

A sales force, e.g., a Bank's or broker's sales force, may call on 'clients' such as institutional and high-net-worth investors or corporation to suggest possible trades and take orders. The term 'Structuring' may relate to the creation of complex financial products, which embed derivatives, and as such typically offer much greater margins and returns than underlying cash securities. Bank/broker Sales and structuring desks (commonly referred to as 'Sales') may then communicate their clients' orders to the appropriate 'trading desks' who can price and execute trades, or structure new products that fit a specific need.

There are various apparatus and processes allowing sales to communicate the bank tentative or committed proposal for a possible transaction (trade) that is composed of one or more financial instruments, the trade of which is to be transacted between the bank and the client or between the client and a $3^{rd}$ party such as, for example, an exchange.

A trade idea may be used to communicate a proposal for a transaction of a trade to a client. The trade idea is typically a quantitative marketing document in the form of an electronic file or document, which can be displayed on a computer screen, processed and/or printed. Various industry-standard file types are used including Microsoft Excel, Microsoft Word, Microsoft PowerPoint, HyperText Markup Language (HTML), Portable Document Format (PDF), Rich Text Format (RTF), and various Extensible Markup Language (XML) coding. The content-type typically involves text (in various possible languages), diagrams (vectors) and images (bitmaps).

A term sheet includes a more specific description of a transaction, which may be generated both before and after a trade transaction. The term sheet includes details such as payment dates, condition for payments, and the like.

Conventional manual mechanisms developed by banks/brokers for manually generating trade ideas and/or term sheets are specifically tailored for that bank's needs, typically made ad-hock for each structure and hard to customize. Such conventional mechanisms generate rigidly defined trade ideas and/or term sheets, which are typically partial in their functionality and coverage.

SUMMARY

Some embodiments include, for example, devices, systems, and methods of generating, e.g., automatically generating, customized trade articles, e.g., including trade ideas and/or term sheets.

Some embodiments include a system including a memory having stored thereon trade-article-generator instructions; and a processor to execute the trade-article-generator instructions resulting in a trade-article generator application, wherein the trade-article generator application is to receive trade information including a plurality of values of one or more trade-related parameters defining at least one trade with respect to at least one financial instrument, and to automatically generate a customized electronic trade article corresponding to the trade based on a predefined trade-article layout, wherein the trade-article layout defines one or more sections to include one or more respective content elements, wherein, based on one or more attributes of the trade, the trade-article generator application is to automatically select, for at least one of the sections, a predefined content element to be included in the section from a plurality of predefined content elements corresponding to the section, and wherein the trade-article generator is to generate the customized electronic trade article including the at least one selected content element.

In some embodiments, the plurality of predefined content elements correspond to a respective plurality of trade scenarios, each trade scenario including a different combination of one or more attributes selected from one or more predefined sets of attribute types.

In some embodiments, the trade-article generator is to select the content element corresponding to a trade scenario including at least the same asset type and the same derivative-strategy group as an asset type and a derivative-strategy group of the trade, respectively.

In some embodiments, the predefined sets of attribute types include at least one of a predefined set of one or more asset-type attributes, a predefined set of one or more derivative-strategy group attributes, a predefined set of one or more derivative class attributes, and a predefined set of one or more transaction attributes.

In some embodiments, the set of asset type attributes includes at least one of a foreign exchange asset, an interest rate asset, a credit asset, a commodity asset, and an equity asset.

In some embodiments, the at least one trade includes a structured trade including a plurality of trades with respect to a plurality of instruments, and wherein the trade-article generator application is to automatically select the content element to be included within the section based on one or more attributes of the structured trade.

In some embodiments, the trade-article generator application is to automatically select the content element based on at least one of a number of the instruments, an order of two or more of the instruments, and a type of one or more of the instruments.

In some embodiments, the memory has stored thereon customized-structuring instructions, wherein the processor is to execute the customized-structuring instructions resulting in a customized-structuring application, wherein the customized-structuring application is to receive a plurality of strategy parameters defining strategy requirements with respect to one or more financial assets, wherein the customized-structuring application is to automatically determine at least one structured trade based on the strategy parameters, wherein the customized-structuring application is to provide trade information defining the structured trade to the trade-article generator application, and wherein the trade-article generator application is to automatically generate the customized electronic trade article corresponding to the structured trade.

In some embodiments, the hedging-scenario parameters include at least one of a base currency, a currency to be hedged, a hedging date, a maximal allowed cost of the structured trade, and a maximal allowed loss resulting from the structured trade.

In some embodiments, the trade-article generator application is to provide a user with a plurality of predefined trade-article layouts, and to generate the customized electronic trade article based on a selected trade-article layout, which is selected by the user from the plurality of layouts.

In some embodiments, the trade-article generator application is to redefine one or more of the sections based on instructions received from a user.

In some embodiments, the trade-article generator application is to allow the user to perform at least one of rearranging a layout of the plurality of sections, formatting one or more of the sections, and modifying the content of one or more of the sections.

In some embodiments, the trade-article generator application is to define one or more layout attributes of the trade-article layout based on a predefined layout master page.

In some embodiments, the layout attributes include at least one of a page-orientation of the trade-article layout, one or more page margins of the trade-article layout, one or more attributes of a header of the trade-article layout, one or more attributes of a footer of the trade-article layout, a language of the trade-article layout, and one or more attributes of a logo to be included in the trade-article layout.

In some embodiments, the trade article includes a trade idea.

In some embodiments, the plurality of sections include at least one of an outline section including an outline of the trade; a pricing section including one or more pricing parameters of the trade; an advantages section describing one or more advantages of the trade; a disadvantages section describing one or more disadvantages of the trade; at least one chart section including one or more charts corresponding to the trade; a disclaimer section including one or more disclaimers; and a summary section including a summary of the trade.

Some embodiments include a system including a memory having stored thereon trade-article-generator instructions; and a processor to execute the trade-article-generator instructions resulting in a trade-article generator application, wherein the trade-article generator application is to receive trade information including a plurality of values of one or more trade-related parameters defining at least one trade with respect to at least one financial instrument, and to automatically generate a customized electronic trade article corresponding to the trade based on a predefined trade-article layout, wherein the trade-article layout defines one or more sections to include one or more respective content elements, wherein at least one of the content elements includes one or more placeholders to present the trade-related parameters, and wherein the trade-article generator is to generate the customized electronic trade article including the one or more content elements by inserting the values of the trade-related parameters into the one or more placeholders.

In some embodiments, based on one or more attributes of the trade, the trade-article generator application is to automatically select from a plurality of predefined content elements corresponding to a section a content element to be included within the section.

In some embodiments, the plurality of predefined content elements correspond to a respective plurality of trade scenarios, each trade scenario including a different combination of one or more attributes selected from one or more predefined sets of attribute types.

In some embodiments, the trade-article generator is to select the content element corresponding to a trade scenario including at least the same asset type and the same derivative-strategy group as an asset type and a derivative-strategy group of the trade, respectively.

In some embodiments, the predefined sets of attribute types include at least one of a predefined set of one or more asset-type attributes, a predefined set of one or more derivative-strategy group attributes, a predefined set of one or more derivative class attributes, and a predefined set of one or more transaction attributes.

In some embodiments, the at least one trade includes a structured trade including a plurality of trades with respect to a plurality of instruments, and wherein the trade-article generator application is to automatically select the content element to be included within the section based on one or more attributes of the structured trade.

In some embodiments, the trade-article generator application is to automatically select the content element based on at least one of a number of the instruments, an order of two or more of the instruments, and a type of one or more of the instruments.

In some embodiments, the memory has stored thereon customized-structuring instructions, wherein the processor is to execute the customized-structuring instructions resulting in a customized-structuring application, wherein the customized-structuring application is to receive a plurality of strategy parameters defining strategy requirements with respect to one or more financial assets, wherein the customized-structuring application is to automatically determine at least one structured trade based on the strategy parameters, wherein the customized-structuring application is to provide trade information defining the structured trade to the trade-article generator application, and wherein the trade-article generator application is to automatically generate the customized electronic trade article corresponding to the structured trade.

In some embodiments, the strategy parameters include at least one of a base currency, a currency to be hedged, a hedging date, a maximal allowed cost of the structured trade, and a maximal allowed loss resulting from the structured trade.

In some embodiments, the trade-article generator application is to provide a user with a plurality of predefined trade-article layouts, and to generate the customized electronic trade article based on a selected trade-article layout, which is selected by the user from the plurality of layouts.

In some embodiments, the trade-article generator application is to redefine one or more of the sections based on instructions received from a user.

In some embodiments, the trade-article generator application is to allow the user to perform at least one of rearranging a layout of the plurality of sections, formatting one or more of the sections, and modifying the content of one or more of the sections.

In some embodiments, the trade-article generator application is to define one or more layout attributes of the trade-article layout based on a predefined layout master page.

In some embodiments, the layout attributes include at least one of a page-orientation of the trade-article layout, one or more page margins of the trade-article layout, one or more attributes of a header of the trade-article layout, one or more attributes of a footer of the trade-article layout, a language of the trade-article layout, and one or more attributes of a logo to be included in the trade-article layout.

In some embodiments, the trade article includes a trade idea.

Some embodiments may provide other and/or additional benefits and/or advantages including, but not limited to, trade term sheet, trade agreement, trade summary, trade confirmations, trade reporting, trade reconciliations, trade settlements, help and training documents, and the like.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

Figure 8B:
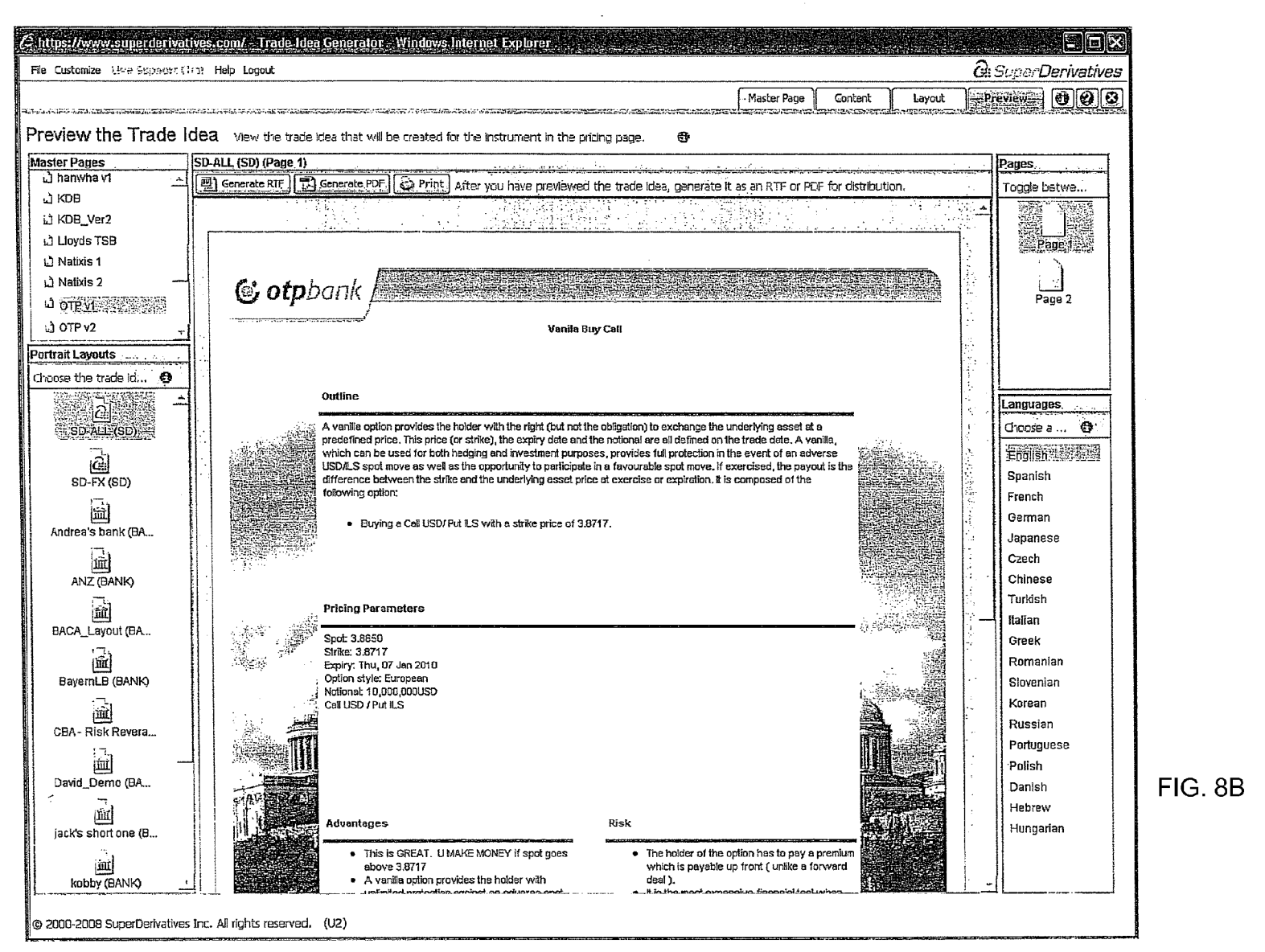

FIGS. 8A-12 are schematic block diagram illustrations of interface components and trade idea generation tools, in accordance with some demonstrative embodiments.

FIGS. 25-31 are schematic block diagram illustrations of content element definition interface tools in accordance with some demonstrative embodiments.

DETAILED DESCRIPTION

Figure 1:
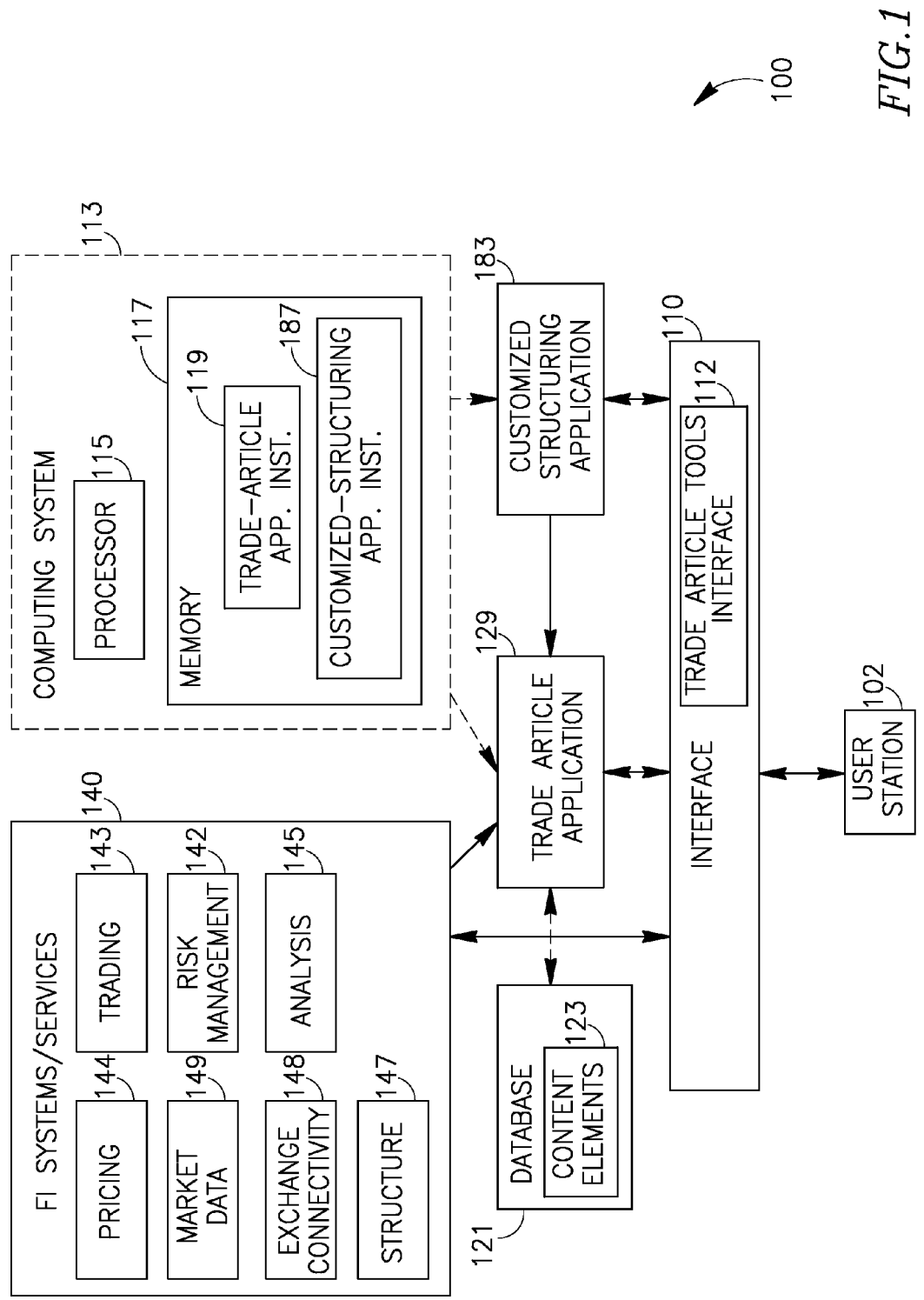
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Discussions herein utilizing terms such as, for example, "processing," "computing," "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Some embodiments may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), Wi-Fi, Wi-Max, ZigBee™, Global System for Mobile communication (GSM), 2G, 2.5G, 3G, 3.5G, or the like. Some embodiments may be used in various other devices, systems and/or networks.

Some demonstrative embodiments are described herein in the context of generating a trade idea corresponding to a financial instrument, e.g., a stock option. It should be appreciated, however, that some embodiments may be applied to other financial instruments and/or markets, and embodiments are not limited to stock options. One skilled in the art may apply some embodiments to other financial instruments including, for example, options and/or option-like instruments, other derivatives and non-derivatives such as stocks or bonds, and the like. As and example options may include options on interest rate futures, options on commodities, and/or options on non-asset instruments, such as options on the weather, and the like, with variation as may be necessary to adapt for factors unique to a given financial instrument.

Some demonstrative embodiments are described herein in the context of a trade idea. It should be appreciated, however, that some embodiments may be applied to customize any other suitable trade article, for example, a term sheet, a trade agreement, a trade summary, trade confirmations, a trade reporting, trade reconciliations, trade settlements, help and training documents, and the like.

Some demonstrative embodiments may be implemented or utilized by any suitable financial institute, e.g., a bank, broker, and/or organization involved with some aspect of financial instrument trading and/or processing.

Trade ideas and/or terms sheets are considered necessary in the process of marketing and selling of complex financial instruments. A trade idea may present various challenges such as, for example:
1. There are a huge variety of possible financial instruments and composed and/or structured trades, which may be very complex. Standardizing and automating the creating, distribution and/or management process can be very cumbersome;
2. New financial instruments and types of trades are frequently added, and need to be supported in the Trade Idea;
3. Preparing a Trade Idea manually or semi-manually may take hours and require a lot of expertise and effort, especially when simulation is involved;
4. Graphical customization such as for colors, fonts and file-type (Excel, Word etc.) as well as localization for language, local regulatory and legal requirements and conventions;
5. The saving, management and re-use/editing of an existing Trade Idea—required for business or regulatory purposes—can be cumbersome without an underlying dedicated flexible mechanism;
6. Each financial institute, e.g., bank and/or broker, has its own marketing, branding, trading, risk management policies, so the ability to consistently create and maintain institute-specific customization must be provided; and/or
7. The environment is very competitive and dynamic and must allow both the single sales person and the overall management to initiate and react quickly to changing market and client requirements.

As an overview, some embodiments include a method, device and/or system of automatic generation and/or delivery of a specifically formatted, customized and/or styled trade article, e.g., a trade idea, for example, in the form of an electronic document which, for example, outlines in detail a proposal corresponding to a transaction of a trade composed of one or more financial instruments; and/or a term sheet describing details, definitions, and/or terms of the transaction, e.g., payment dates, conditions, and the like.

Some embodiments include a trade article generator application capable of automatically generating a customized trade article, thereby providing a wide-scope, generalized, adaptable and/or customizable solution for the automated generation of any type of trade article. Such solution may be required, for example, by practitioners such as sales people or "structurers" in banks, e.g., in order to remain competitive and serve their own clients.

In some embodiments, the trade article generator may automatically generate a customized, specialized and/or appropriate trade article based, for example, on parameters predefined by an administrator and/or user preferences. The trade article generator may allow partial or full customization of the trade article, e.g., in aspects of branding, layout, style, content, and the like.

As described in detail below, in some embodiments the trade article generator application may be capable of automatically determining content to be included in one or mores sections of the trade article corresponding to a trade based on one or more attributes of the trade and/or one or more user-related attributes, e.g., a predefined language.

As described in detail below, in some embodiments, the trade article generator application may determine the arrangement and/or layout of the sections of the trade article based on a customized master page layout, which may be defined by one or more predefined users, e.g., an administrator.

In some embodiments, the trade article generator may be implemented by any suitable financial institute, e.g., bank, broker, and the like, to generate a customized trade article, e.g., trade idea and/or trade term sheet, corresponding to any suitable financial transaction to be offered by the financial institute, e.g., by a sales force of the financial institute. The customization of the trade article may improve, for example, an efficiency, productivity, sophistication, serviceability, and/or profitability of the sales force and/or financial institute.

In some embodiments, the trade article generator application may receive as an input a parameterized description of the trade in any suitable code, language, style, or format such as, for example, Financial Products Markup Language (FpML) or any other suitable format; relevant market condition parameters; and/or any suitable user customization, styling, formatting and/or production parameters.

In some embodiments, the trade article generator may generate one or more output trade articles, e.g., including a trade idea and/or term sheet, which may be formalized as an electronic article, e.g., a document or file, in industry standard formats such as Microsoft Excel, Microsoft Word, Microsoft PowerPoint, HyperText Markup Language (HTML), Portable Document Format (PDF), Rich Text Format (RTF), and the like. The output formats may include human readable or machine-only readable formats. In one example, the trade idea document may contain analysis of the trade and, optionally, one or more other customized data, information, values and/or fields such as, for example, headers, footers, icons, company logo, graphs, description text in any supported natural language, disclaimers, and the like, e.g., as described in detail below.

In some embodiments, the customized trade article may be composed of multiple sub components that can be customized by a user to fit any suitable document layout, style and/or content, e.g., as described below.

In some embodiments, the trade article generator may support client management, e.g., using archive, search and report capabilities as well as the generation of marketing campaigns.

In some embodiments, the trade article may include a dynamic and/or interactive file, e.g., when activated within a computing device, for example, to allow a user to interactively and/or dynamically edit the trade article, e.g., using suitable calculation capabilities.

In some embodiments, the trade article generator may generate an executable trade article, e.g., an executable trade idea and/or term sheet, having a format enabling dealing and/or execution, e.g., on-line execution of the transaction corresponding to the trade article.

In some embodiments, the trade article may be structured in a way that would allow sending the trade article over a computer network to a trading counterparty or to a trading hub such as an exchange, for example, for the purpose of quoting or negotiating a price or executing an agreement to buy or sell the financial instruments included in the trade article.

In some embodiments, the trade article may include a "clearing" trade article structured for the purpose of "clearing" an already executed trade. The clearing" trade article may be structured, e.g., in content and/or format, in a way that would allow sending the trade article over a computer network to the relevant party such as, for example, a trading counter-party, a clearing house, a custodian or a central counterparty (CCP) (an agency acting as buyer to market participant sellers, and seller to market participant buyers). The "clearing" may involve the management of post-trading, pre-settlement credit exposures, to ensure that trades are settled in accordance with market rules, even if a buyer or seller should become insolvent prior to settlement. The "clearing" may include the operations of reporting/monitoring, risk margining, netting of trades to single positions, tax handling, failure handling, and the like.

In some embodiments, the delivery of the trade article may involve any existing delivery or messaging protocol public or proprietary including without limitation File Transfer Protocol (FTP), Hypertext Transfer Protocol (HTTP), HTTP secure (HTTPS), Fax transmission, electronic-mail (E-mail) and/or telephone transmission. In another embodiment, the trade article may be published on an internal or public website, and the like.

Reference is now made to FIG. 1, which schematically illustrates a block diagram of a system 100 in accordance with some demonstrative embodiments.

System 100 includes one or more user stations or devices 102, for example, a PC, a laptop computer, a PDA device, a console, and/or a terminal, that allow one or more users to structure, price and/or analyze a transaction of a financial instrument, and to generate a customized trade article corresponding to transaction of the financial instrument. The trade article may include, for example, a trade idea and/or a term sheet, corresponding to any suitable trade, deal and/or structure of any suitable financial instrument, e.g., derivatives asset classes, Foreign Exchange (FX), Interest Rate, Equity, Commodities, Credit, and the like.

The user of device 102 may include, for example, a business analyst, a corporate structuring manager, a salesperson, a trader, a risk manager, a front office manager, a back office, a middle office, a system administrator, and the like.

Devices 102 may be implemented using suitable hardware components and/or software components, for example, processors, controllers, memory units, storage units, input units, output units, communication units, operating systems, applications, or the like.

In some embodiments, system 100 may include a trade-article generator application 129 capable of generating one or more customized trade articles, e.g., trade ideas and/or term sheets, corresponding to one or more trades defined by users 102, e.g., as described below.

System 100 may also include an interface 110 to interface between users 102 and trade article generator application 129. Interface 110 may optionally interface between users 102 and one or more FI systems and/or services 140. Services 140 may include, for example, one or more risk management systems 142, one or more pricing services 144, one or more analysis services 145, one or more trading systems 143, one or more exchange connectivity systems 148, one or more market data systems 149, and/or one or more other suitable FI-related services, systems and/or platforms. Additionally or alternatively, interface 110 may interface between trade article generator application 129 and any other suitable computing module, for example, an FI system a CRM system, an archive, an E-mail service, an HTTP service, an FTP service, an application, and/or any suitable module capable of providing, e.g., automatically, input to trade article generator application 129 and/or receiving a trade article generated by trade article generator application 129, e.g., as described herein.

In some embodiments, trade-article generator application 129 may be implemented as part of FI systems/services 140 and/or as part of any other suitable system or module, e.g., as part of any suitable server.

In some embodiments, trade-article generator application 129 may include a local or remote application executed by any suitable computing system 113. For example, computing system 113 may include a suitable memory 117 having stored thereon trade-article-generator instructions 119; and a suitable processor 115 to execute trade-article-generator instructions 119 resulting in trade-article generator application 129. In some embodiments, computing system 113 may include a server to provide the functionality of trade article generator application 129 to users 112. In other embodiments, computing system 113 may be part of user station 102. For example, trade-article-generator instructions 119 may be downloaded and/or received by users 102 from another computing system, such that trade application generator application 129 may be executed locally by users 102. For example, instructions 119 may be received and stored, e.g., temporarily, in a memory or any suitable short-term memory or buffer of user device 102, e.g., prior to being executed by a processor of user device 102. In other embodiments, computing system 113 may include any other suitable computing arrangement and/or scheme.

In some embodiments, computing system 113 may also execute one or more of FI systems/services 140. In other embodiments, trade article generator application 129 may be implemented separately from one or more of FI systems/services 140.

In some embodiments, interface 110 may be implemented as part of trade article generator application 129, FI systems/services 140, and/or as part of any other suitable system or module, e.g., as part of any suitable server.

Interface 110 may be associated with and/or included as part of devices 102. In one example, interface 110 may be implemented, for example, as middleware, as part of any suitable application, and/or as part of a server. Interface 110 may be implemented using any suitable hardware components and/or software components, for example, processors, controllers, memory units, storage units, input units, output units, communication units, operating systems, applications. In some embodiments, interface 110 may include, or may be part of a Web-based structuring/pricing application, a website, a web-page, a stand-alone application, a plug-in, an ActiveX control, a rich content component (e.g., a Flash or Shockwave component), or the like.

Interface 110 may be configured to allow a user to enter commands, to define a financial instrument; to define and/or structure a transaction corresponding to the financial instrument; to receive a pricing of the transaction; to analyze the transaction; to customize a trade article, e.g., a trade idea and/or term sheet, corresponding to the transaction; and/or to otherwise control and/or analyze the user's structuring/pricing operations.

In some embodiments, interface 110 includes one or more trade article generation interface tools 112, for example, one or more customized trade-idea and/or term sheet generation interface tools as are described herein. Trade idea generation tools 112 may enable generation of trade articles for trades in any suitable structuring, pricing, and/or analysis product based, for example, on selected assets, option class, currency, current pricing, payments, notional and other relevant values that can be manually added once the user decides to generate a trade idea.

In some embodiments, system 100 may also include at least one database 121, which stores data related to users 102, data related to one or more trades defined by the users, and/or one or more customized trade article configurations and/or layouts, e.g., as described herein. In one example, database 121 may store data related to previously generated trade articles, e.g., as described below.

In some embodiments, user 102 may define and/or structure at least one trade ("deal") with relation to at least one financial instrument. For example, user 102 may structure the trade using structure service 147 via interface 110.

In some embodiments, user 102 may use interface 110 and/or tools 112 to instruct trade-article generation application 129 to generate a customized trade-article corresponding to the trade. In one example, trade article generation tools 112 may be accessible from a "sales tools" button/menu of interface 110.

In some embodiments, trade-article generator application 129 may receive trade information including a plurality of values of one or more trade-related parameters defining the trade, e.g., from structure service 147 and/or from pricing service 144. In one embodiment, trade article application 129 may receive an input including a parameterized description of the trade, e.g., including a list of composing financial instruments, typically expressed as a Financial Products Markup Language (FpML) structure, or the like. This may allow for utmost generality, coverage and extensibility of supported trades and financial instruments. The input may include relevant market data values. For example, trade-article application 129 may receive from structure service 147 a plurality of attributes of the trade. Trade article application 129 may also receive from pricing service 144 one or more pricing parameters corresponding to the trade. Trade-article application 129 may also receive user information corresponding to user 102, e.g., as described below.

In some embodiments, trade-article application 129 may automatically generate a customized electronic trade article, e.g., a trade idea and/or term sheet, corresponding to the trade. The trade article may be generated in any suitable format, e.g., Microsoft Excel, Microsoft Word, Microsoft PowerPoint, RTF, HTML, PDF various XML codings, and the like.

In some embodiments, application 129 may generate the trade article based on a predefined trade-article layout, which may define one or more sections to include one or more respective content elements (also referred to as "widgets"). The content elements may include different types of content elements, for example, text, graphs, charts, and the like. The content elements may be fully customizable for size, shape, style and/or actual content, e.g., as described below. One or more default content elements may be defined, including, for example, "option description", "advantages", "disadvantages", "scenario analysis", "pay out charts", "pay out tables", "historical charts", "legal disclaimers", and the like, e.g., as described below.

In some embodiments, application 129 may also create a record including a XML standard definition or any other type of definition of the trade article, which may be used for further re-use, editing and/or archiving. For example, the XML definition may be stored in database 121.

In some embodiments, the attributes of the trade may be received from a customized structuring ("look for strategy (LFS)") application 183. In one embodiment, memory 117 may have stored thereon customized-structuring instructions 187, and processor 115 may execute customized-structuring instructions resulting in customized-structuring application 183. In other embodiments, customized-structuring instructions 187 may be stored and/or executed by any other suitable computing device and/or server. For example, customized-structuring application 183 may be implemented as part of structuring service 147 or any other suitable system and/or service.

In some embodiments, customized-structuring application 183 may receive a plurality of strategy parameters defining strategy requirements with respect to one or more financial assets. Customized-structuring application 183 may to automatically determine at least one structured trade based on the strategy parameters, and provide trade information defining the structured trade to trade-article generator application 129.

Trade-article generator application 129 may then automatically generate the customized electronic trade article corresponding to the structured trade. For example, user 102 may provide customized-structuring application 183 with her financial exposure with relation to one or more financial assets such as, for example, payments to pay or receivable to receive in different currencies and dates, or interest to pay on debt in different currencies, consumption of material or fuel, and the like, e.g., using a suitable interface tool as described below with reference to FIG. 5. Customized-structuring application 183 may determine suggestions for hedging the exposure by various derivatives and/or hedging strategies, which may include several possible structures that satisfy some requirements that user 102 enters such as the cost of the structure, the maximum loss vs. using forward or futures, and the like. Customized structuring application 183 may automatically provide the one or more suggested customized structures to trade article generator application 129, which may produce one or more trade articles, e.g., trade ideas, analyzing the one or more suggested customized structures.

In some embodiments, trade article generator application 129 may generate a "comparison" trade article comparing the different suggested customized structures according to any suitable criteria such as, for example, efficiency of the hedge in a wide range of exchange rates, interest rates, commodity prices, and the like.

In some embodiments, customized structuring application 183 may select a customized structure from the different suggested customized structures based on suitable selection criteria, for example, defined by user 102 using interface 100, e.g., as described below with reference to FIG. 5. Accordingly, applications 187 and 129 may automatically generate a customized trade article corresponding to a customized structure defined based on the financial strategy parameters and selection criteria.

In some embodiments, application 129 may generate the trade article corresponding to the customized structure based on a predefined customized-structure trade-article layout. The customized-structure layout may include, for example a "summary" section including content summarizing aspects of the customized structure; a "graph" section including one or more graphs corresponding to the customized structure, for example, a debt service cost graph corresponding to a hedging strategy structure, a performance profile graph corresponding to an investor strategy structure, and the like; a "description" section including content describing the customized structure; and/or any other suitable section and/or content.

In some embodiments, trade article generator application 129 may provide a fully customizable solution to allow full life cycle for generating and managing trade ideas and/or term sheets between financial institutes, for example, banks, brokers, and/or hedge funds, and their clients.

In some embodiments, an administrator, for example, of a financial institute, e.g., a bank, broker and/or a hedge fund, may set up logo, legal disclaimer, banner, letter head, and/or any other suitable properties of the trade article, as a shared brandable style to be used by a set of defined users, e.g., sales people. Users 102 may edit and/or create content for different predefined content elements of the trade article, e.g., using tool 300 as described below with reference to FIG. 3.

In one example, a financial institute, e.g., bank or broker, may want to offer a transaction to a client, e.g., in response to a client request and/or in order to promote a structure. User 102, e.g., a sales person, structuring specialist, and/or trader may model a proposed deal, e.g., using structure service 147, customized structuring application 183 and/or pricing service 144, e.g., as described above. Once user 102 is comfortable with the deal configuration, user 102 may invoke trade article generator application 129, e.g., using tools 112.

In some embodiments, trade article generator application 129 may retrieve the structure's parameters and/or the user's customization preferences, and select the most appropriate content elements and lay them in a trade-article layout, e.g., a default layout. User 102 can then preview the proposed trade article; change a layout by choosing a different layout or moving widgets around in drag and drop fashion; and/or fully edit any widget and change its content or style, e.g., as described below with reference to FIGS. 8-12.

In some embodiments, once user 102 previews the proposed trade article and is comfortable with it, user 102 can generate a trade idea and/or term sheet and choose, e.g., using tools 112, an output format, e.g., Word, RTF, PowerPoint, PDF, HTML, and the like; and/or a delivery mechanism, e.g., hard copy paper, mail attachment, attachment to SD-CHAT, posting the trade article on a web site, and the like.

In some embodiments, once user 102 receives the trade article, user 102 can model the customized trade article, e.g., using interface 110. If user 102 likes the resulting trade article, user 102 may then initiate an RFQ (Request for Quote) to the Bank and initiate an actual trade. Once a price is negotiated the deal is archived and can be flowed directly to the bank's position and risk systems.

In another example, trade article generator application 129 may be used for post-trade analysis. A user, e.g., sales person, head of desk etc., may search through database 121 and analyze which trade ideas generated trades and which did not. The user can also analyze client patterns and cross-reference them with revenue from clients.

In another example, trade article generator application 129 may be used for marketing campaigns. A financial institute, e.g., a bank or broker, may promote structures in a seamless fashion that allows the generation of personalized trade idea proposals and/or term sheets for structures the financial institute is marketing.

In another example, trade article generator application 129 may be used for Client Relations Management (CRM). A user, e.g., any sales person on the desk, can see which trade ideas were proposed to a client and conduct follow up based on that history.

In another example, trade article generator application 129 may be used for recurring business. A user, e.g., the sales people, may user database 121 to regenerate easily previous trade articles, e.g., trade ideas and/or term sheets, with new parameters.

In another example, trade article generator application 129 may be used as a standalone service. For example, rather than initiating the process via pricing service 123, the user may enter the deal configuration directly into trade article generator application 129, e.g., using tools 112.

As described below, trade article generator application 129 may allow easy branding and/or differentiation by each client, e.g., bank, by allowing the bank to incorporate their Logo, Banner, Letter Head, style, margins, colors etc.

As described below, trade article generator application 129 may allow an administrator to create shared and/or private trade article layouts templates. In each trade-article layout the administrator can decide which widgets she wants to include, how to lay them on the page and which sizes she wants for each of them. Each "Layout" template may be accessible by one or more users, e.g., based on predefined permissions.

In some embodiments, trade article generator application 129 and/or tools 112 may include What-You-See-Is-What-You-Get (WYSIWYG) editors and preview mode; full editing capability in any stage, wizards that guide the creation and editing of widgets step by step, and the like.

In some embodiments, trade article generator application 129 may include a full set of default content elements that describe in detail each possible trade article with different permutations in different languages. User 102 may edit each of these default content elements and/or create their own content elements, as described below with reference to FIGS. 2 and 3. The content elements can be deal-specific or generic with "placeholders", as described below.

In some embodiments, trade article generator application 129 may receive a particular structure of a trade and select the most appropriate content for the particular structure based, for example, on one or more attributes of the trade, e.g., as described below. Trade article generator application 129 may differentiate and support parameterization at an arbitrarily fine granularity, thus allowing potentially the creation of highly specialized and targeted trade ideas and/or term sheets. Trade article generator application 129 may select the most appropriate content based, for example, on the user's preferences and supports having content at the default level, the bank's level or even individual users who can contribute their own content. Trade article generator application 129 may then replace "placeholders" in the chosen trade idea and/or term sheet with actual values corresponding to the particular trade. This may allow using content elements, which at run time will decide the wording based on the trade's specific parameters, e.g., as described below.

In some embodiments, trade article generator application 129 may be fully integrated with pricing service 144, allowing the flow of modeled structures from pricing service 144 to trade article generator application 12, and vice versa. Trade article generator application 129 may also be integrated with trading service 143, allowing a client to generate a Request For Quote from a trade idea generated by trade article generator application 129. Trade article generator application 129 may also be integrated with a suitable Chat system to allow a user to generate a trade article in any format and then send it via the Chat system to the client.

Figure 2:
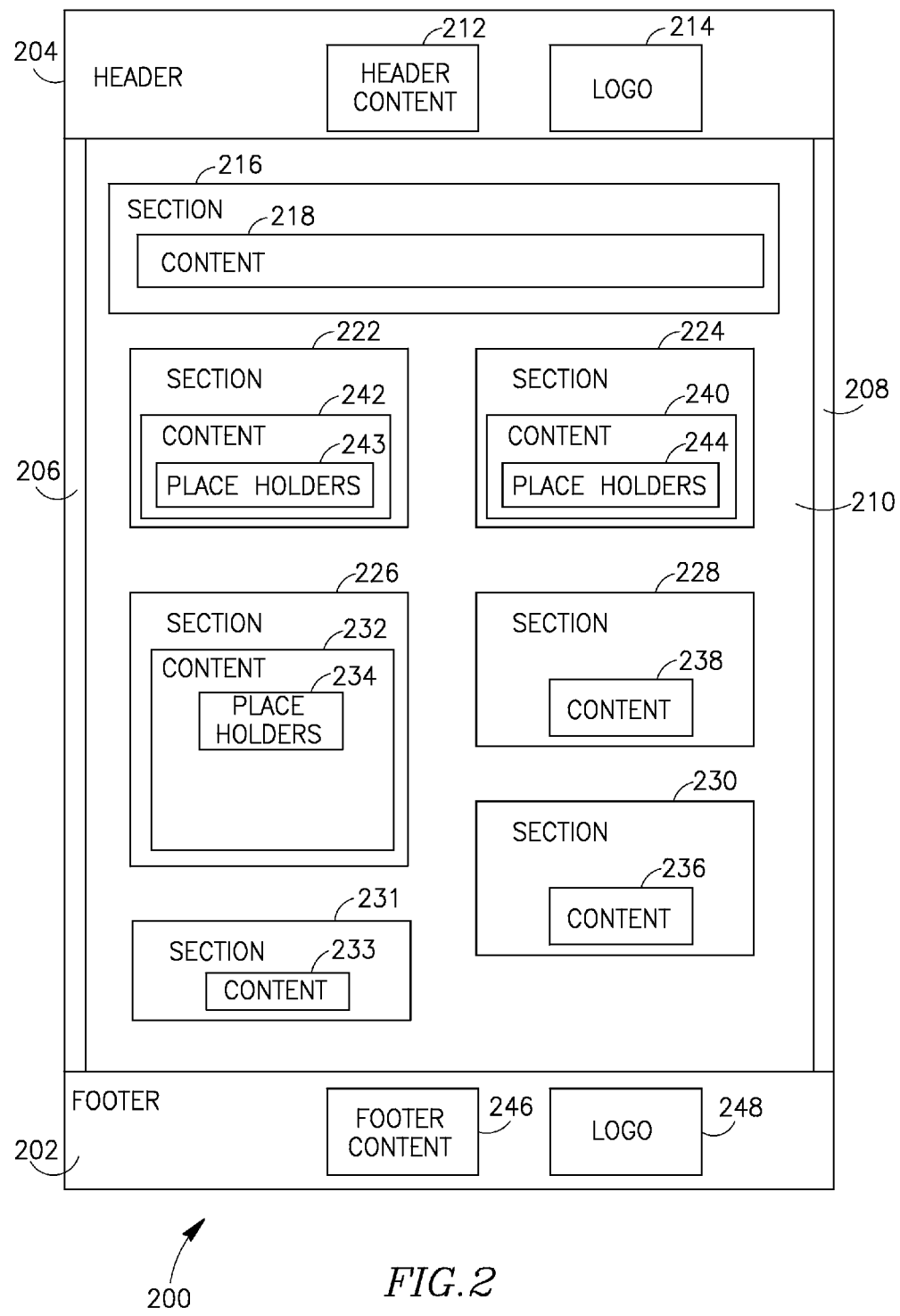
FIG. 2 is a schematic illustration of a trade article, in accordance with some embodiments.

Reference is also made to FIG. 2, which schematically illustrates a trade article 200, in accordance with some embodiments. In some embodiments, trader article 200 may be automatically generated by trade-article generation application 129.

As shown in FIG. 2, trade article 200 may include a trade-article layout portion ("surface") 210, which may be based on a predefined trade-article layout template, e.g., as described below. Trade article 200 may also include a header portion 204, a footer portion 202, a right margin portion 208, and/or a left margin portion 206. Trade-article generator application 129 may define one or more layout attributes of trade-article 200 based on the predefined master page, e.g., as described below. For example, header portion 212 may include any suitable header content 212 and/or any suitable logo 214; and/or footer portion 202 may include any suitable footer content 246 and/or logo 248, e.g., as described below.

One or more trade articles may share a generic layout master page ("master page"), e.g., as described below. Trade article surface 210 may be customized for each specific trade article. The user may be able to edit surface 210 by changing location, text, use additional or different placeholders, and the like, e.g., as described herein. There may be a dedicated Master page per language. A client, e.g., a bank, can optionally customize the master page and trade articles.

In some embodiments, tools 112 (FIG. 1) may be configured to allow user 102 (FIG. 1) to edit a trade-article layout template to fit to its own needs or to create a new trade article layout template if none exist for the scenario in which he is trying to generate a trade article for. If no pre-defined trade-article template exists, then tools 112 (FIG. 1) may prompt user 102 (FIG. 1) with an appropriate message.

In some embodiments, the trade article layout may be customized to define, for example, which content elements are to be used, what is their location, properties, default values, and the like, e.g., as described below. Different authorization levels may be defined for updating the trade article layout template and/or the master page. In one example, master-pages may be customized by an administrator only (customer admin); and/or trade article layout templates may be customized by all types of users (either admin or common user).

In some embodiments, trade article 200 may be formatted in any suitable language, e.g., one or more of the following languages: English; German; Italian; French; Spanish; Japanese, and the like. Trade article generator application 129 (FIG. 1) may select the layout template to be used for generating trade article 200 based, for example, on the user's language property. For example, a layout template with an identical language to the user's selected language may be used. If no layout template with identical language is found, then trade article generator application 129 (FIG. 1) may use a predefined default language, e.g., English. Different sets of layout templates may be defined, for example, for different languages.

In some embodiments, the trade idea layout template may include the definition of meta-data, e.g., including one or more of: [1] which sections are used in the trade article; [2] The accessible resources that the content elements can use; and [3] The instance data that describes the location of each of the content elements and its properties.

In some embodiments, layout portion 210 may include one or more sections to include one or more respective content elements. The section's height and/or width may be dynamically customized. The user can modify the location of the sections on surface 210 using, for example, "drag & drop".

For example, layout portion 210 may include sections 216, 222, 224, 226, 228, 230 and/or 231 to include content elements 218, 242, 244, 232, 238, 236 and/or 233, respectively. One or more attributes, e.g., the dimensions, layout color, font, and the like, of sections 216, 222, 224, 226, 228, 230 and/or 231 may be defined and/or configured based on the trade-article layout, e.g., as described below.

In some embodiments, content elements 218, 242, 244, 232, 238, 236 and/or 233 may include any suitable predefined content, for example:

Client's underlying business exposure or investment goal;
Overall market conditions;
Detailed parameterized outline of each one of the composing financial instruments. Such outline may include parameters such as strike-price, expiry date, notional amount, and the like;
Outcome/payout description and analysis of the trade (strategy) under different eventual market scenarios, trade variations, bank and client actions;
Analysis of how the trade addresses a predefined exposure, hedging situation and/or goal;
Advantages of the trade;
Disadvantages of the trade;
Risk profile analysis;
Cost and payment terms;
Comparison to one or more other trade strategies;
Various sensitivity simulation analyses vs. parameters such as time horizon, transaction variations (e.g., strike prices), and market scenarios (interest rates level, currency exchange rate, and the like);
Contractual, regulatory and/or legal terms and/or disclaimers;
Marketing and branding information about the financial institute, e.g., bank/broker; and/or
Any other suitable content.

Content elements 218, 242, 244, 232, 238, 236 and/or 233 may include the content in any suitable text, diagrams, images and/or any other suitable textual and/or graphical content.

In one embodiment, section 216 may include an "outline" section and content element 218 may include content relating to an outline of the trade; section 222 may include a "pricing" section and content element 242 may include content relating to pricing parameters of the trade; section 228 may include an "advantages" section and content element 238 may include content describing advantages of the trade; section 230 may include a "disadvantages" section and content element 236 may include content describing advantages of the trade; section 226 may include a "payout" section and content 232 may include content analyzing a payout of the trade; section 231 may include a "disclaimer" section and content element 233 may include one or more legal and/or financial disclaimers. In other embodiment, layout portion 210 may include any other number of sections and/or one or more of sections 216, 222, 224, 226, 228, 230 and 231 may include any other suitable type of section. For example, one or more of sections 216, 222, 224, 226, 228, 230 and 231 may include a "structure" section including content describing a structure of the trade; a "result" section including content describing one or more possible results of the trade; a summary section including content summarizing aspects of the trade; a "comparison" section including content comparing the trade to one or more other strategies and/or trades; a "risk analysis" section including content relating to a risk analysis of the trade; a "terms" section including content describing terms of the trade, e.g., payment and/or cost terms; and/or any other suitable section.

In some embodiments, one or more of content elements 218, 242, 240, 232, 238, 236 and 233 may include one or more chart elements including one or more charts corresponding to the trade. For example, one or more of content elements 218, 242, 240, 232, 238, 236 and 233 may include a payout chart, a risk analysis chart, and the like.

In some embodiments, application 129 may determine the content to be included in one or more of the sections based on one or more attributes of the trade. In one embodiment, based on one or more attributes of the trade, trade-article generator application 129 may automatically select from a plurality of predefined content elements corresponding to a section a content element to be included within the section, e.g., as described below. For example, if section 228 includes the "advantages" section, then trade-article generator application 129 may automatically select content element 238 from a plurality of predefined "advantages" content elements relating to a plurality of respective scenarios, as described below.

As described in detail below, trade-article generator application 129 may determine a trade scenario corresponding to the input trade based on one or more attributes of the input trade. Based on the trade scenario corresponding to the input trade, trade-article generator application 129 may determine one or more content elements to be included in the trade article and generate a trade definition textual and graphical description in formal words and customized layout.

As further described below, for each section there may be one or more predefined content, e.g., corresponding to different scenarios, e.g., corresponding to a combination of on one or more of:

The parameters of the trade and its composing financial instruments such as Asset Class (FX/IR/ . . . ), Option Class (Vanilla, Vanilla Straddle, Forward Extra, . . . ), Buy/Sell (for one leg or a strategy);
Selected language;
User/Client/Bank;
End-client category; and/or
Any other suitable attribute.

In some embodiments, application 129 may determine the content to be included in one or more of the sections based on a language definition by user 102, e.g., such that the section includes content in a language defined by user 102, e.g., as defined below.

In some embodiments, for at least one section of the plurality of sections in the trade-article layout, database 121 may store a plurality of scenario-related content elements 123 corresponding a respective plurality of scenarios. A scenario may be defined based on a combination of one or more predefined attributes, for example, trade attributes and/or user-defined attributes, e.g., language. For example, each scenario may include a different combination of one or more attributes selected from one or more predefined sets of attribute types.

In one embodiment, the scenario may include a combination of four trade-related attribute types, for example, an asset-type attribute, an derivative-strategy group (also referred to as "option group") attribute, a derivative class (also referred to as "option class") attribute, and a transaction ("deal properties") attribute; and a language attribute. In other embodiment, the scenario any other suitable combination of any suitable attribute types.

The asset type attribute may include, for example, Interest Rate (IR), Equity (EQ), Commodity (CM), Foreign Exchange (Fx), Credit (CD), and the like.

The option group attribute may include, for example, option group attributes corresponding to the asset type attribute. For example, the option group attribute may include barrier, cap/floor strategies, CMS, structured notes, structured swaps, swap, swaptions, vanilla, and the like, with respect to the IR asset; Asian, vanilla, vanilla strategy, variance swaps, and the like, with respect to the EQ asset; Asian, Asian strategy, Asian strip, Asian strip strategy, barrier, basket, binary, multi assets, quanto, single swap, swaption, vanilla, vanilla strategy, vanilla strip, and the like, with relation to the CM asset; accrual/floaters, accumulator, average options, barrier, basket, binary, cash deals, chooser, compounds, cross-asset barrier, deposit notes, European digital, fader, forward start, forward structures, loan related, multi-period barriers, partial/window barrier, quanto, structured products, tarn, vanilla, vanilla strategy, and the like, with respect to the Fx asset; and/or any other suitable option group.

The option class attribute may include, for example, risk reversal, butterfly, cap, vanilla, floor, knock in, knock out, double knock in, double knock out, and/or derivative strategy.

The deal properties may include, for example, a combination of one or more of the following, e.g., for each structure "leg": buy, sell, call, put, fixed, floating, pay, receive, and the like.

The language attribute may be selected from a list of predefined languages, e.g., English, Japanese, French, German, Spanish, and the like.

A scenario may include a combination of only some or all of the attributes. For example, a first scenario may include the combination "Fx; risk reversal; English; Buy Call (first leg); Sell put (second leg)". A second scenario may include the broader combination of "Fx; Risk reversal; French".

Figure 3:
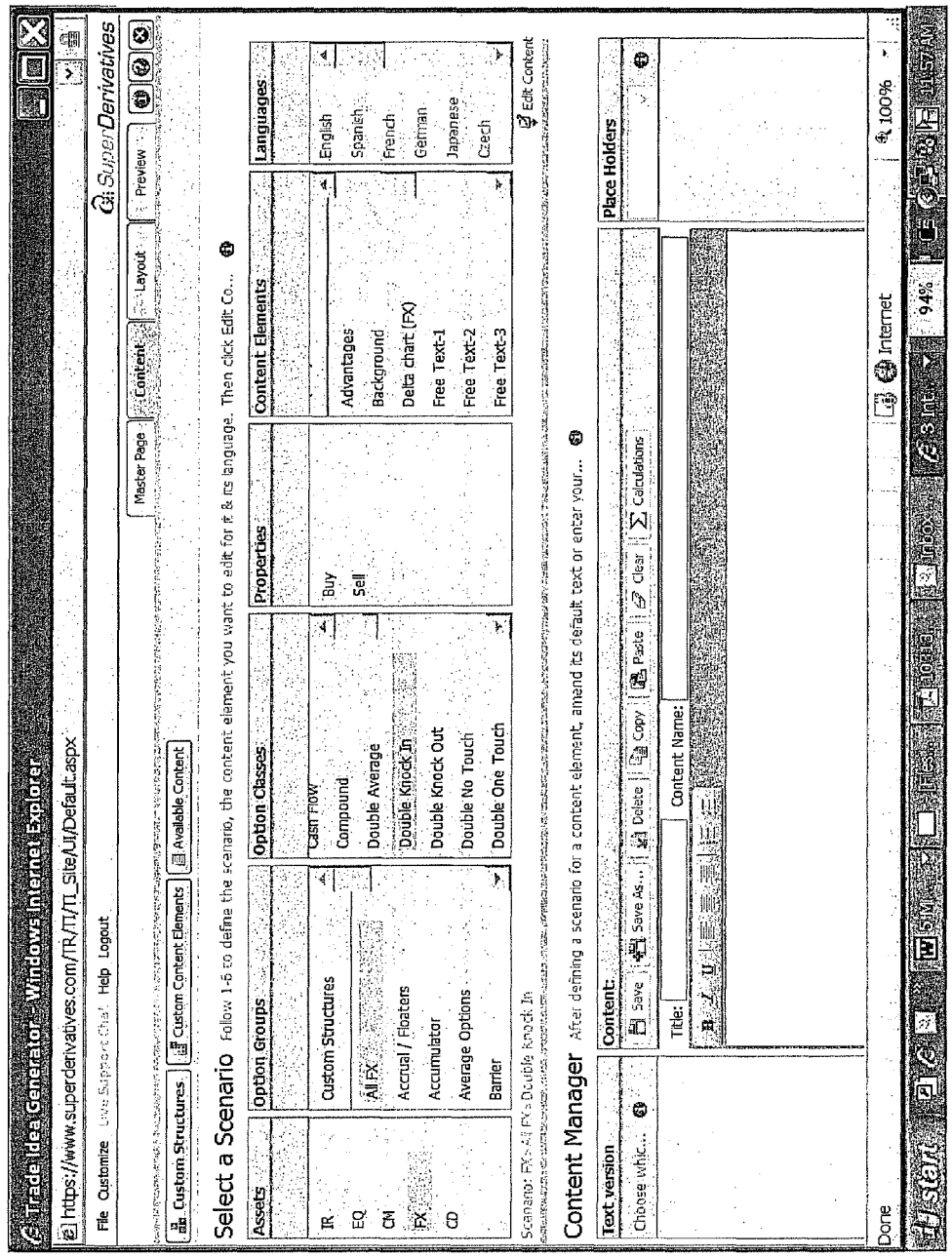
FIG. 3 is a schematic illustration of a content definition interface tool, in accordance with some demonstrative embodiments.

In some embodiments, application 129 and/or interface 110 may provide users 102 with the ability to define one or more scenarios and/or content elements corresponding to the scenarios. For example, interface 110 may provide user 102 with a content definition tool 300, as shown in FIG. 3, allowing the ability to define a scenario by selecting one or more of the scenario attributes from a list of predefined attributes. Content definition tool 300 may also allow user 102 to define a content element corresponding to the selected attribute and to a selected section. For example, interface 110 may allow the user to define an "advantages" section corresponding to the scenario "Fx; risk reversal; English; Buy Call (first leg);

Sell put (second leg)". The defined scenario and/or the defined content element corresponding to the scenario may be stored in database 121. Accordingly, interface 110 may allow defining a plurality of scenarios and a plurality of content elements corresponding to the scenarios and to the different sections of the trade article. For example, a plurality of "outline" content elements may be defined with respect to a plurality of respective scenarios, e.g., such that each "outline" content element includes content customized to the specific scenario.

In some embodiments, when generating a customized trade article corresponding to a specific trade, application 129 may select a content element to be included in a section from the plurality of predefined content elements corresponding to the section, based on a scenario corresponding to the trade, e.g., as described below.

In some embodiments, application 129 may determine the asset type and derivative-strategy group type corresponding to the trade; select from the plurality of predefined scenarios one or more scenarios including at least the same asset type and the same derivative-strategy group type as the asset type and derivative-strategy group type of the trade, respectively; prioritize the selected scenarios based on predefined prioritization criterion; and select from the plurality of predefined content elements corresponding to the selected scenarios the content element to be included in a section of the trade-article layout based on the prioritized scenarios, e.g., as described below.

In some embodiments, one or more of the content elements to be included in the trade article may include one or more "placeholders" identifying trade-related parameters to be inserted. For example, the placeholders may identify one or more known-parameter-values, e.g., strike price, currency type, amount and/or value of underlying asset, spot price, forward rate, date, and the like, which may be deduced, for example, from the XML structure that defines the trade. For example, content element 242 may include one or more placeholders 243 identifying trade-related parameters related to the content of section 222; content element 224 may include one or more placeholders 244 identifying trade-related parameters related to the content of section 224; and/or content element 232 may include one or more placeholders 234 identifying trade-related parameters related to the content of section 232. For example, if section 222 includes the "pricing" section, then placeholders 243 may indicate a spot price, a forward price, a maturity date, and or an amount to be inserted as part of content element 242 based on the specific trade-information of the trade.

In some embodiments, when generating the customized trade article corresponding to the trade, trade-article generator 129 may insert the specific values of the trade-related parameters into the one or more placeholders, thereby to automatically generate the content elements including the specific data of the trade, e.g., as described below.

In some embodiments, trade-article generator application 129 may provide user 102 with a plurality of predefined trade-article "preview" layouts, and may generate the customized electronic trade article based on a selected trade-article layout, which is selected by user 102 from the plurality of layouts. For example, the different selected trade-article layouts may include different sections and/or different arrangements of the sections, e.g., as described below.

In some embodiments, tools 112 may allow user 112 to redefine one or more of the sections of the customized trade article, e.g., by editing the content elements of one or more of the sections, formatting one or more of the sections, formatting the header, footer and/or margins, and the like. Based on instructions received from user 102 via tools 112, trade-article generator application 129 may reconfigure the trade article.

In some embodiments, trade-article generator application 129 may define one or more layout attributes of the trade-article layout based on a predefined layout master page, e.g., as described below.

Figure 4:
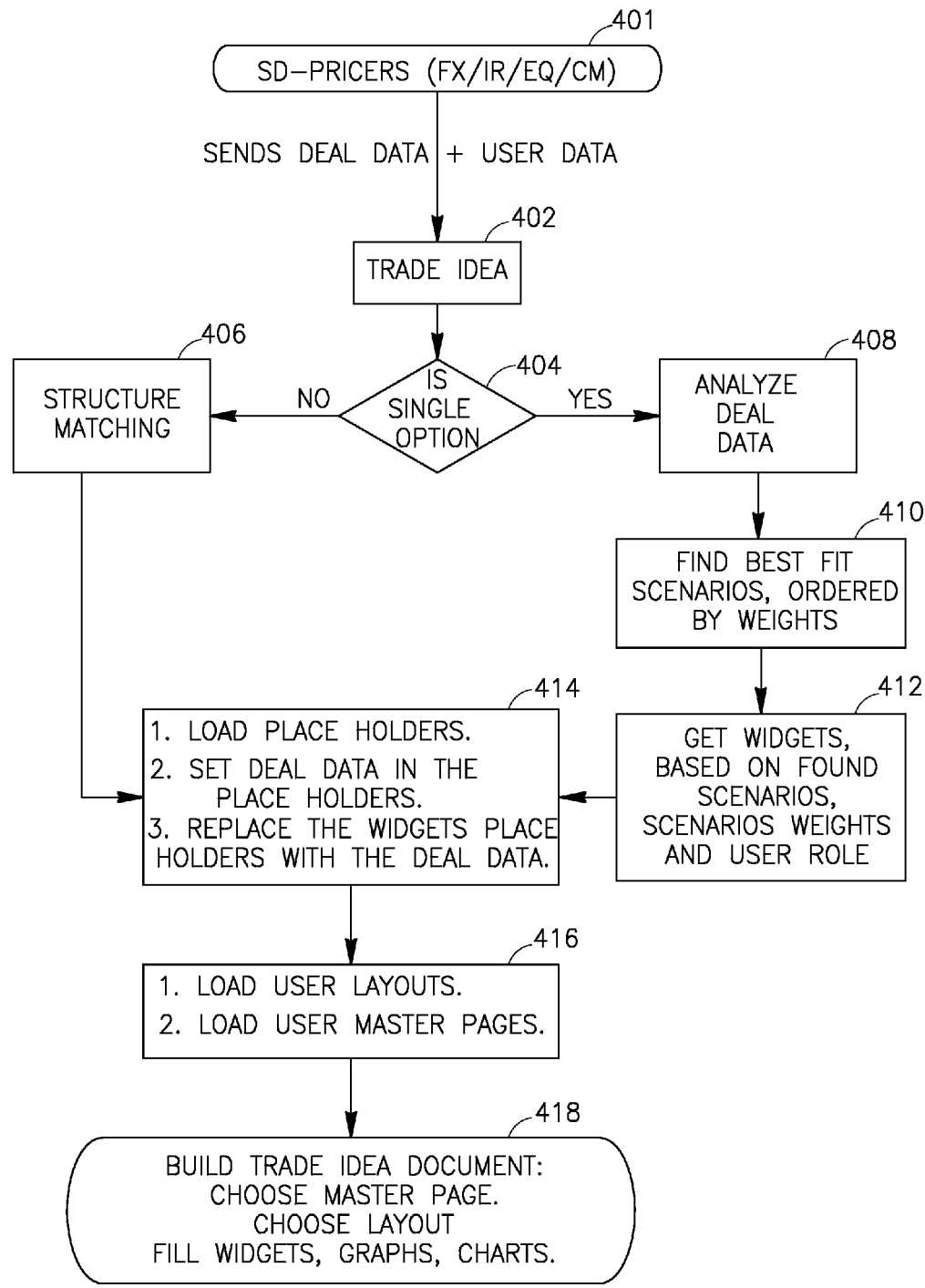
FIG. 4 is a schematic flow chart illustration of a method of generating a customized trade article, in accordance with some demonstrative embodiments.

Reference is made to FIG. 4, which schematically illustrates a method of generating a customized trade article, in accordance with some demonstrative embodiments. In one embodiment, one or more operations of the method of FIG. 4 may be performed by trade article generator application 129 (FIG. 1) to generate a customized trade article, e.g., trade article 200 (FIG. 2) corresponding to at least one trade, e.g., as defined and/or structured by user 102 (FIG. 1) and/or customized-structuring application 183 (FIG. 1).

As indicated at block 401, the method may include defining and/or structuring at least one trade. For example, user 102 (FIG. 1) may define and/or structure a trade using interface 110 (FIG. 1), structure service 147 (FIG. 1) and/or customized structure application 183 (FIG. 1), e.g., as described above.

As indicated at block 402, the method may include initiating the generation of a customized trade article corresponding to the defined trade. For example, trade article generator application 129 (FIG. 1) may be provided with trade information corresponding to the trade and/or user information corresponding to user 102 (FIG. 1). In one embodiment, the trade information may include parameters defining the trade, e.g., received from structure service 147 (FIG. 1) and/or customized structuring application 183 (FIG. 1), and/or pricing information corresponding to the trade, e.g., received from pricing service 144 (FIG. 1), as described above. The user information may include, for example, information identifying the user, an organization, e.g., bank, to which the user belongs, a language defined by the user, user preferences defined by the user, and the like.

As indicated at block 404, the method may include determining whether or not the input trade includes a structured trade, which includes a plurality of financial instruments, or a single-instrument trade.

As indicated at block 408, the method may include analyzing the trade information to determine one or more attributes of the trade, e.g., if the input trade is a single-instrument trade. For example, the analysis may include determining the asset type of the trade and/or the option class of the trade, e.g., as described above. For example, if the trade includes the buying of an Fx vanilla call, then trade article generator application may identify that the asset of the trade is Fx, and that the option class of the trade is vanilla.

As indicated at block 410, the method may include selecting and prioritizing one or more scenarios from a plurality of predefined scenarios, based on the trade information.

In some embodiments, trade article generator application 129 (FIG. 1) may select out of the plurality of predefined scenarios stored in database 121 (FIG. 1) a set of one or more scenarios having an asset type attribute and an option class attribute matching the asset type attribute and an option class attribute of the trade, e.g., as described above.

Trade article generator application 129 (FIG. 1) may remove from the set of scenarios the scenarios that have attributes, e.g., deal properties and/or language properties, different than the attributes of the trade. For example, if the includes the buying of an Fx vanilla call and the user-defined language is English, then trade article generator application 129 (FIG. 1) may remove from the set of scenarios a scenario including selling an Fx vanilla call, a scenario including buying an Fx vanilla put, a scenario in the German language relating to the buying of an Fx vanilla call, and the like. Accordingly, the remaining set of scenarios may include scenarios having attributes that match the attributes of the trade.

Trade article generator application 129 (FIG. 1) may prioritize the set of scenarios according to predefined prioritization criteria. For example, a first scenario having a first number of attributes matching the attributes of the trade may be assigned with a lower prioritization weight compared to a second scenario having a second number, greater than the first number, of attributes of attributes matching the attributes of the trade. For example, if the trade includes the buying of an Fx vanilla call and the user-defined language is English then a first English scenario relating only to the Fx asset type attribute may have a lower prioritization weight than a second English scenario relating generally to an Fx vanilla; which in turn may have a lower prioritization weight than a third English scenario relating to an Fx vanilla call; which in turn may have a lower prioritization weight than and a fourth English scenario relating to the buying of an Fx vanilla call.

As indicated at block 412, the method may include determining content elements to be included in the customized trade article based on the prioritized set of scenarios.

In some embodiments, for each section of the sections to be included in the trade article, trade article generator application 129 (FIG. 1) may select the content element to be included in the section from the plurality of predefined content elements, e.g., based on the prioritized set of scenarios. For example, trade article generator application 129 (FIG. 1) may first attempt to fill the required sections with the content elements corresponding to the scenario having the highest priority weight; if there are one or more remaining sections, for which content elements corresponding to the scenario of the highest priority weight, which were not found, then trade article generator application 129 (FIG. 1) may determine whether the content elements corresponding to the scenario having the second-highest priority weight include content elements corresponding to the remaining sections; if there are one or more still-remaining sections, for which content elements were still not found, then trade article generator application 129 (FIG. 1) may determine whether the content elements corresponding to the scenario having the third-highest priority weight include content elements corresponding to the still-remaining sections; and so on, e.g., until content elements are found for all required sections, and/or until the content elements of all the scenarios have been checked. If, for example, all content elements of all the scenarios have been checked and there are still one or more sections, for which no content element has been found, then trade article generator application 129 (FIG. 1) may, for example, leave the section empty and/or include in the section predefined default content, or an error message.

In one example, section 216 (FIG. 2) includes an "outline" section, section 222 (FIG. 2) includes a "pricing" section, section 228 (FIG. 2) includes an "advantages" section, section 230 (FIG. 2) includes a "disadvantages" section, section 226 (FIG. 2) includes a "payout" section, and section 231 (FIG. 2) includes a "disclaimer" section, e.g., as described above with reference to FIG. 2. According to this example, trade article generator application 129 (FIG. 1) may determine which of the content elements corresponding to the fourth English scenario may be included in sections 218, 222, 224, 226, 228 and/or 230 (FIG. 2).

If, for example, the content elements corresponding to the fourth English scenario include all of the outline, pricing, advantages, disadvantages, payout, and disclaimer content elements, then trade article generator application 129 (FIG. 1) may generate trade article 200 (FIG. 2) based only on the content elements corresponding to the fourth English scenario. However, if the content elements corresponding to the fourth English scenario do not include one or more of the outline, pricing, advantages, disadvantages, payout, and disclaimer content elements, then trade article generator application 129 (FIG. 1) may determine which, if any, of the content elements corresponding to the third English scenario match the remaining unfilled sections. If one or more of the outline, pricing, advantages, disadvantages, payout, and disclaimer content elements are not found in both the fourth and third scenarios, then trade article generator application 129 (FIG. 1) may determine which, if any, of the content elements corresponding to the second English scenario match the remaining unfilled sections, and so on.

In one example, the plurality of content elements include outline, pricing, advantages, disadvantages, payout, and disclaimer content elements corresponding to the first scenario; outline, pricing, advantages, disadvantages, and disclaimer content elements corresponding to the second scenario; outline and pricing content elements corresponding to the third scenario; and pricing, advantages, and disadvantages content elements corresponding to the fourth scenario. According to this example, trade article generator application 129 (FIG. 1) may define "outline" content element 218 (FIG. 2) to include the outline content element corresponding to the third scenario, "pricing" content element 243 (FIG. 2) to include the outline content element corresponding to the fourth scenario, "advantages" content element 238 (FIG. 2) to include the advantages content element corresponding to the fourth scenario, "disadvantages" content element 236 (FIG. 2) to include the disadvantages content element corresponding to the fourth scenario, "payout" content element 232 (FIG. 2) to include the payout content element corresponding to the first scenario, and "disclaimer" content element 233 (FIG. 2) to include the disclaimer content element corresponding to the second scenario.

As indicated at block 406, the method may include determining a predefined structure scenario matching the trade, e.g., if the trade includes a structured trade. For example, content definition toll 300 (FIG. 3) may allow the user to define a plurality of content elements corresponding to a plurality of structures, and trade article generator application 129 (FIG. 1) may search for predefined content elements corresponding to the structure of the trade.

As indicated at block 416, the method may include inserting values of trade-related parameters corresponding to the trade into one or more placeholders of the selected content elements. For example, trade article generator application 129 (FIG. 1) may insert the trade-related parameters of the trade into one or more of placeholders 243, 244 and 234 (FIG. 2) of the selected content elements 242, 240, and 232 (FIG. 2), respectively.

As indicated at block 418, the method may include retrieving one or more trade-article layouts and/or one or more master pages corresponding to the user. For example, trade article generator application 129 (FIG. 1) may determine the trade article layout and/or the master page o be implemented for generating the customized trade article, for example, based on the trade information and/or the user information.

In one embodiment, when a user generates a trade article, trade article generator application 129 (FIG. 1) may determine the trade article layout and/or master page to be used, for example, for at least part of the following info:

Instrument+Context (page data, language, customer id, long/short);

Bank-Specific Master page or general Master page;

Bank-Specific TradeIdea layout template or general TradeIdea layout template;

Default language is English. If no layout template with the required language defined, the English version will be used;

The determined trade article layout may define the one or more sections to be included in the customized trade article, e.g., as described above with reference to FIG. 2.

As indicated at block 418, the method may include generating the customized trade article. For example, trade article generator application 129 (FIG. 1) may configure the trade-article based on the selected master page and the selected trade-article layout. Trade article generator application 129 (FIG. 1) may insert into the sections of the trade-article layout the selected content elements including the trade-related parameters inserted in the placeholders, e.g., as described above with reference to blocks 412 and 414.

Figure 5:
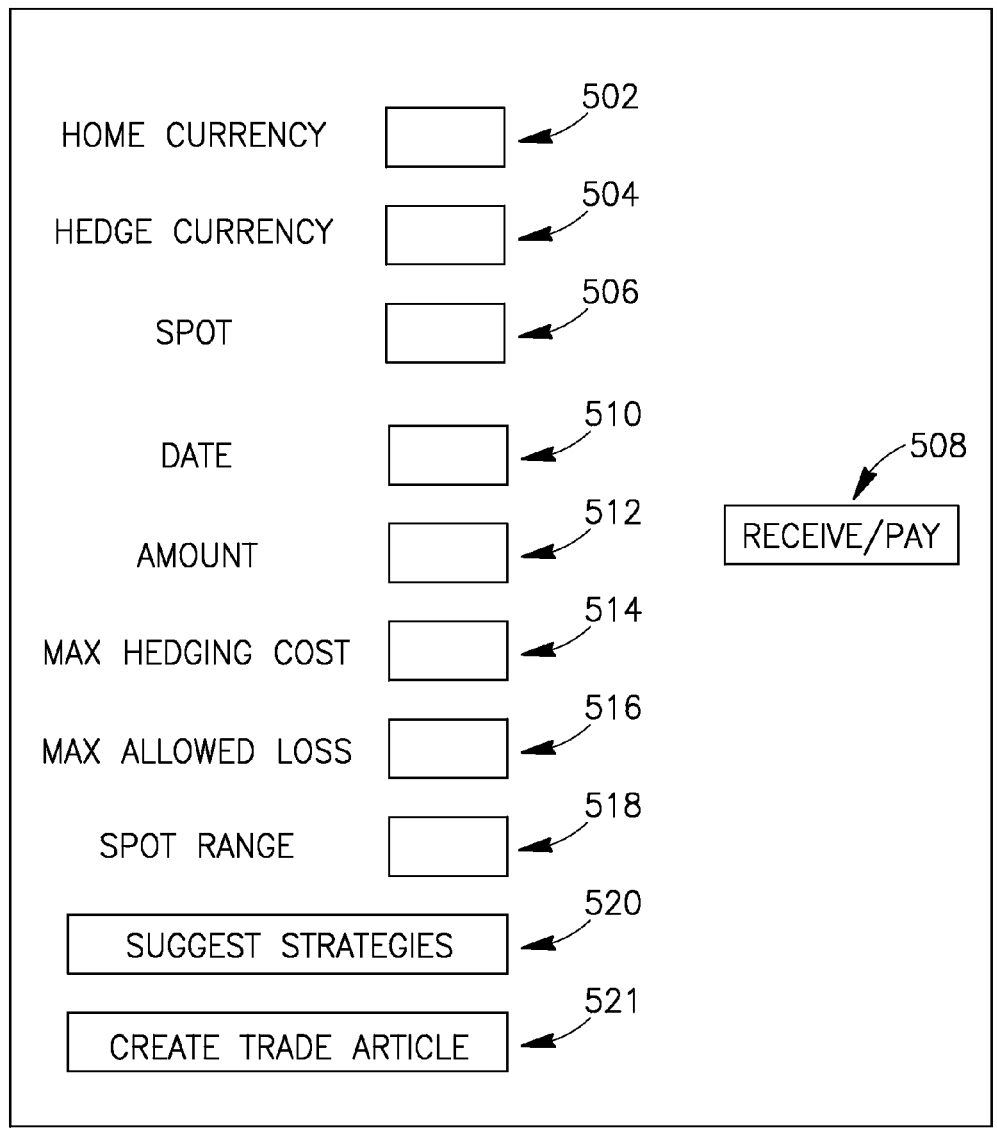
FIG. 5 is a schematic illustration of a customized structuring interface tool, in accordance with some demonstrative embodiments.

Reference is made to FIG. 5, which schematically illustrates a customized structuring interface tool 500, in accordance with some demonstrative embodiments. In one embodiment, interface tool 500 may be implemented as part of interface 110 (FIG. 1), e.g., to interface between user 102 (FIG. 1) and customized structuring application 183 (FIG. 1).

In some embodiments, interface tool 500 may allow a user to define a plurality of Fx strategy parameters for which customized structuring application 183 (FIG. 1) is to provide one or more suggested structured trades, e.g., as described above.

As shown in FIG. 5, interface tool 500 may include a first currency input 502 to receive from the user a definition of a base ("home") currency, and a second currency input 504 to receive from the user a definition of a currency to be hedged. For example, the user may input the string "US" to currency input 502 and the string "JPY" to currency input 504, e.g., if the user wishes to define a hedging strategy relating to the currency pair US dollar-Japanese Yen.

In some embodiments, interface tool 500 may include a spot rate input 506 to receive a current spot level of the currency pair defined by inputs 502 and 504.

In some embodiments, interface tool 500 may include an expiry date input 510 to receive from the user a date in which the underlying exposure is due to be paid or received.

In some embodiments, interface tool 500 may include a spot rate input 508 to receive form the user an input indicating whether at the expiry date the user is committed to receive or pay the hedged currency of input 504.

In some embodiments, interface tool 500 may include an amount input 512 to receive from the user the notional of the exposure in the hedged currency defined by input 504.

In some embodiments, interface tool 500 may include a maximum hedging cost input 514 to receive from the user a maximal premium the user is willing to pay for the hedging.

In some embodiments, interface tool 500 may include a maximum allowed loss input 516 to receive from the user a maximal amount of money the user is prepared to lose as a result from the hedge.

In some embodiments, interface tool 500 may include a spot range input 518 to receive from the user a requested spot range.

In some embodiments, interface tool 500 may include a "suggest strategies" instruction input 520 to allow the user to instruct customized structuring application 183 (FIG. 1) to determine the one or more suggested customized structures based on the input provided by the user.

In some embodiments, interface tool 500 may include a "create trade article" instruction input 521, e.g., in the form of an instruction button, to allow the user to instruct customized structuring application 183 (FIG. 1) and/or trade article generator application 129 (FIG. 1) to automatically provide to the user one or more trade articles, e.g., trade ideas, analyzing the one or more suggested customized structures. For example, after providing inputs 50, 504, 506, 508, 510, 512, 514, 516 and/or 518, the user may use instruction input 521 to cause customized structuring application 183 (FIG. 1) to automatically provide the one or more suggested customized structures to trade article generator application 129 (FIG. 1), which in turn may automatically generate the one or more customized trade articles, e.g., as described above.

Figure 6:
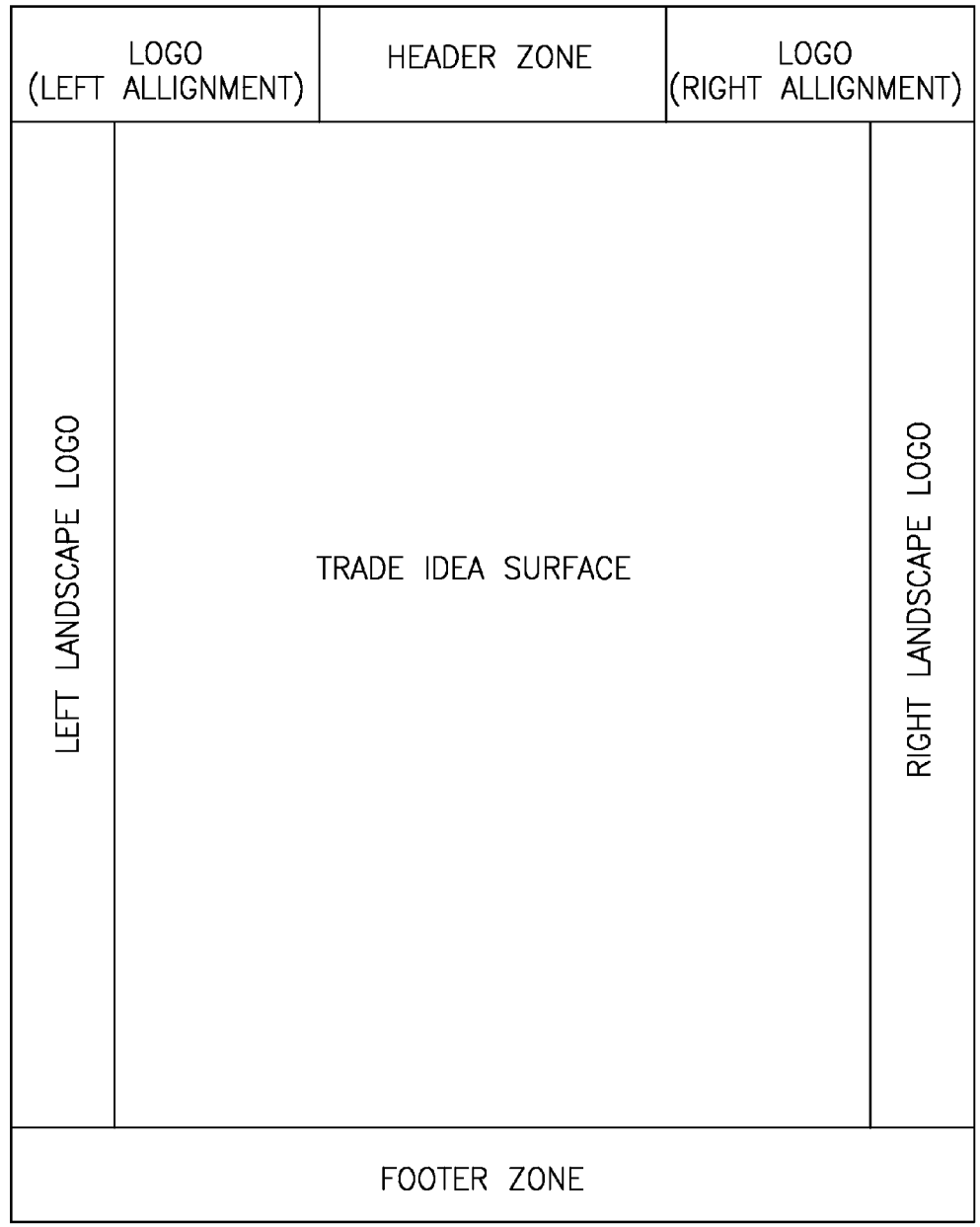
FIG. 6 is a schematic illustration of a master page layout in accordance with some demonstrative embodiments.

Reference is now made to FIG. 6, which schematically illustrates a master page layout 500, in accordance with some demonstrative embodiments. In one embodiment, master page layout 500 may be utilized by trade-article generation application 129 (FIG. 1) to configure trade article 200 (FIG. 2, e.g., as described above.

In some embodiments, master page layout 600 may include a plurality of customizable components that can be customized by user 102 (FIG. 1), e.g., to fit to its own document layout. Each of the customized subcomponent may appear, for example, on each page. The trade idea surface may be dynamic and may change based on the trade idea context (Option class, etc.). Text that is used in one or more of the components can include parameters such as date, time, page number, etc.

In some embodiments, master page 600 may be used either in quarto or A4 pages, the difference will be reflected by the size of the Landscape logo zone, which is smaller in a quarto page. The Master Page size can be defined in the Master page definition (default: A4).

In some embodiments, general properties define theme values that will be used while using master page 600, i.e., the general property values that are defined in the master page level will be used as the defaults for all the used components within the page, for example, as follows:
1. Language ID;
2. Header Font Type (used by components on the Trade Idea Surface);
3. Header Font Size;
4. Header Font Color;
5. Use underline for headers (Yes/No);
6. Header underline color; and/or
7. Disclaimer properties (based on all font properties with additional disclaimer text). If a disclaimer is defined, it will automatically be added to the end of the generated document at the last page of the Trade Idea—as part of the Trade Idea Surface.

Figure 7:
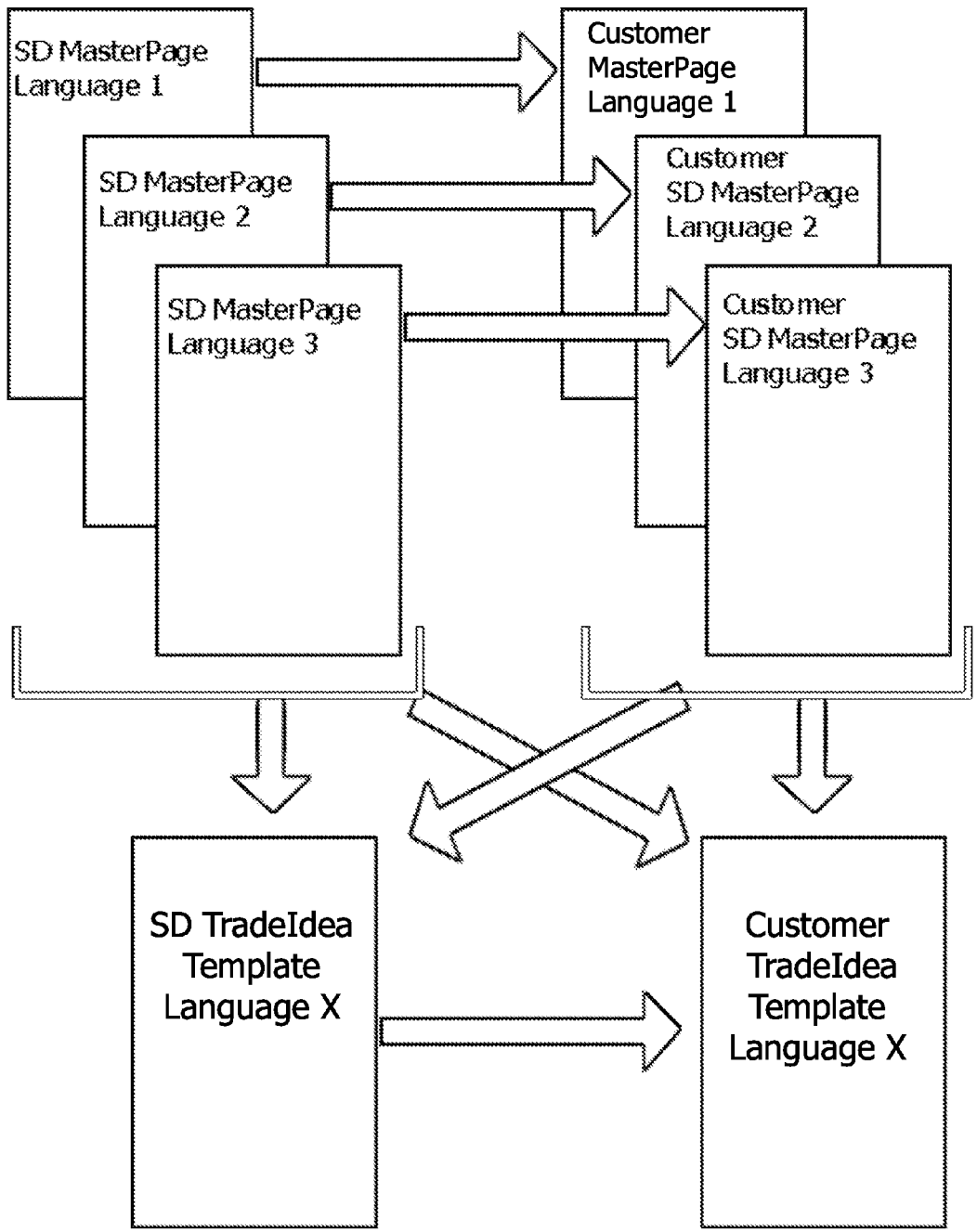
FIG. 7 is a schematic illustration of customization of a master page and/or trade idea in accordance with some demonstrative embodiments.
Figure 8A:
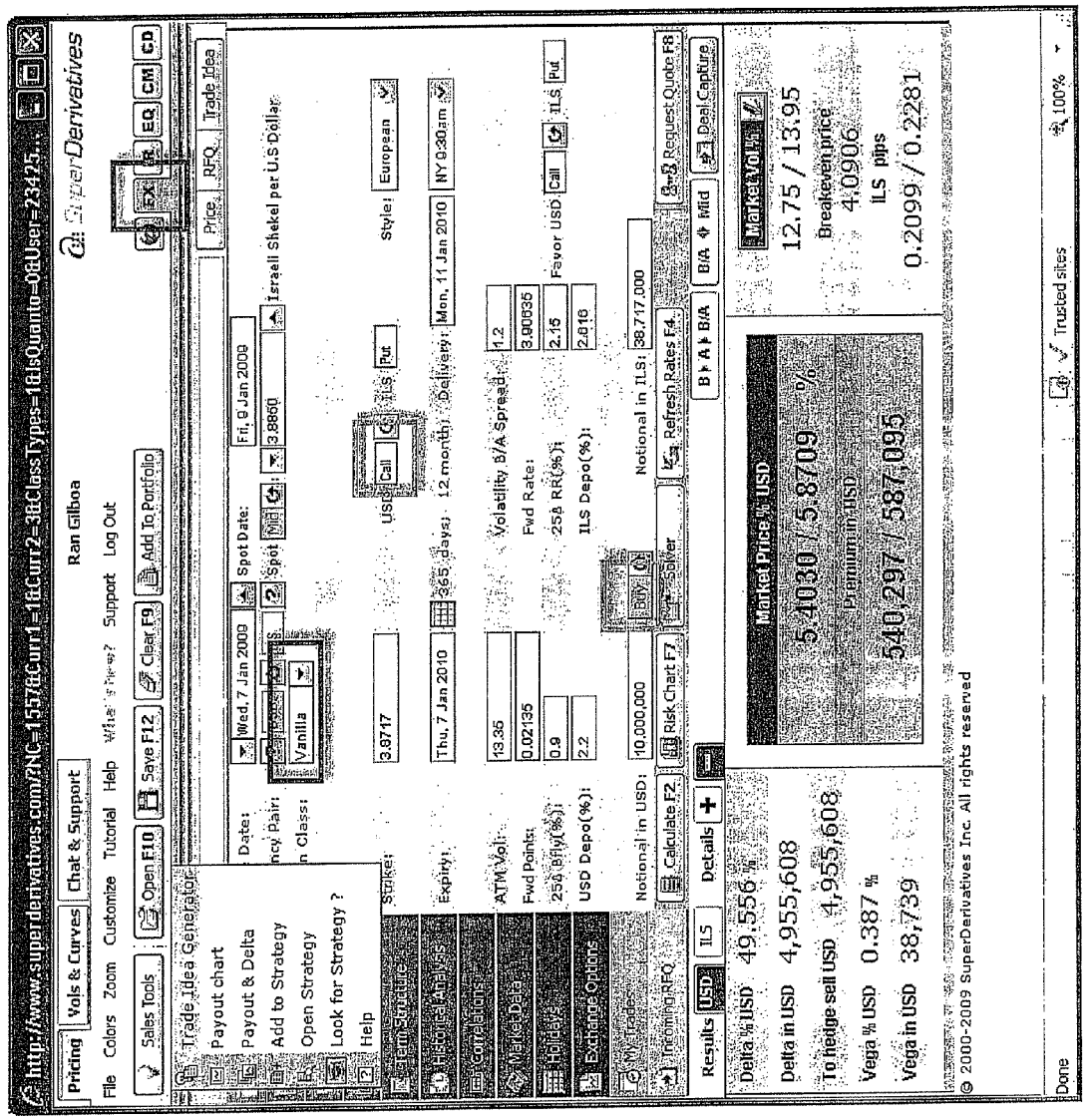

As shown in FIG. 7, trade article generator application 129 (FIG. 1) may provide a default master page and/or a default trade idea template, e.g., for different scenarios. If multiple languages are used, each language has a dedicated set of templates. The user may customize the master page and/or the trade idea template to fit it to its own needs. In such case a new template is generated based on the original one.

The user may perform, for example, one or more of the following modifications to the master page and/or template:

|  | Master Page In Use | Trade Idea Template In Use |
| --- | --- | --- |
| No modification done | Default as supplied by application 129 | Default as supplied by application 129 |
| Customer modified the Master Page | Customer-specific Master Page | Default as supplied by application 129 |
| Customer modified the Trade Idea Template | Default as supplied by application 129 | Customer-specific Template |
| Customer modified both the Master Page and the Trade Idea Template | Customer-specific Master Page | Customer-specific Template |

The selection of the template to be used by application 129 (FIG. 1) for the trade idea generation may be made, for example, using the following rules for each option:

Master Page Selection:

Application 129 (FIG. 1) checks if a Master Page template of the user's company with his selected language exists.

If no, Application 129 (FIG. 1) checks if a Master Page template with his selected language with the default company exists.

If no, Application 129 (FIG. 1) takes the default Master Page template, meaning, default language (English) and default company.

Trade Idea layout Template Selection:

Application 129 (FIG. 1) checks if a template of the user's company with his selected language exists.

If no, Application 129 (FIG. 1) checks if a template with his selected language with the default company exist.

If no, Application 129 (FIG. 1) takes the default Master Page template, meaning, default language (English) and default company.

The Header zone may be located at the top of the page aligned to center/left/right corners of the heading place, dependent on the user's decision and mostly based on the location of the logo if such is used. The user may define one or more of the following values in the header:

Header Text;
Header Font Type;
Header Font Size;
Header Font Color;
Header Foreground Color and/or
Header Alignment—Left, Center or Right.

The footer zone may be located at the bottom of the page. It can be located at the center/left/right corners of the heading place, dependent on the user's decision. The user can define similar values as defined for the header to be used in the footer: Text, Font, Size, Color, Foreground Color and alignment.

The logo may be located on top of the header zone and therefore the header foreground color wraps it. The logo zone may be fixed in size and therefore the user should supply a logo with the predefined size to fit into the page. The user may adjust his logo to a fixed size. The logo can appear left, right or at the center of the header zone. In most cases where it appears at the center, it replaces the header itself, which is defined as an empty header.

The landscape logo zone is optional and can appear in one of the following locations: Left, Right, Both Left & Right, None.

There may be a fixed size for the logo for different cases. The size of the left landscape logo might be different than the size of the right landscape logo.

Figure 9:
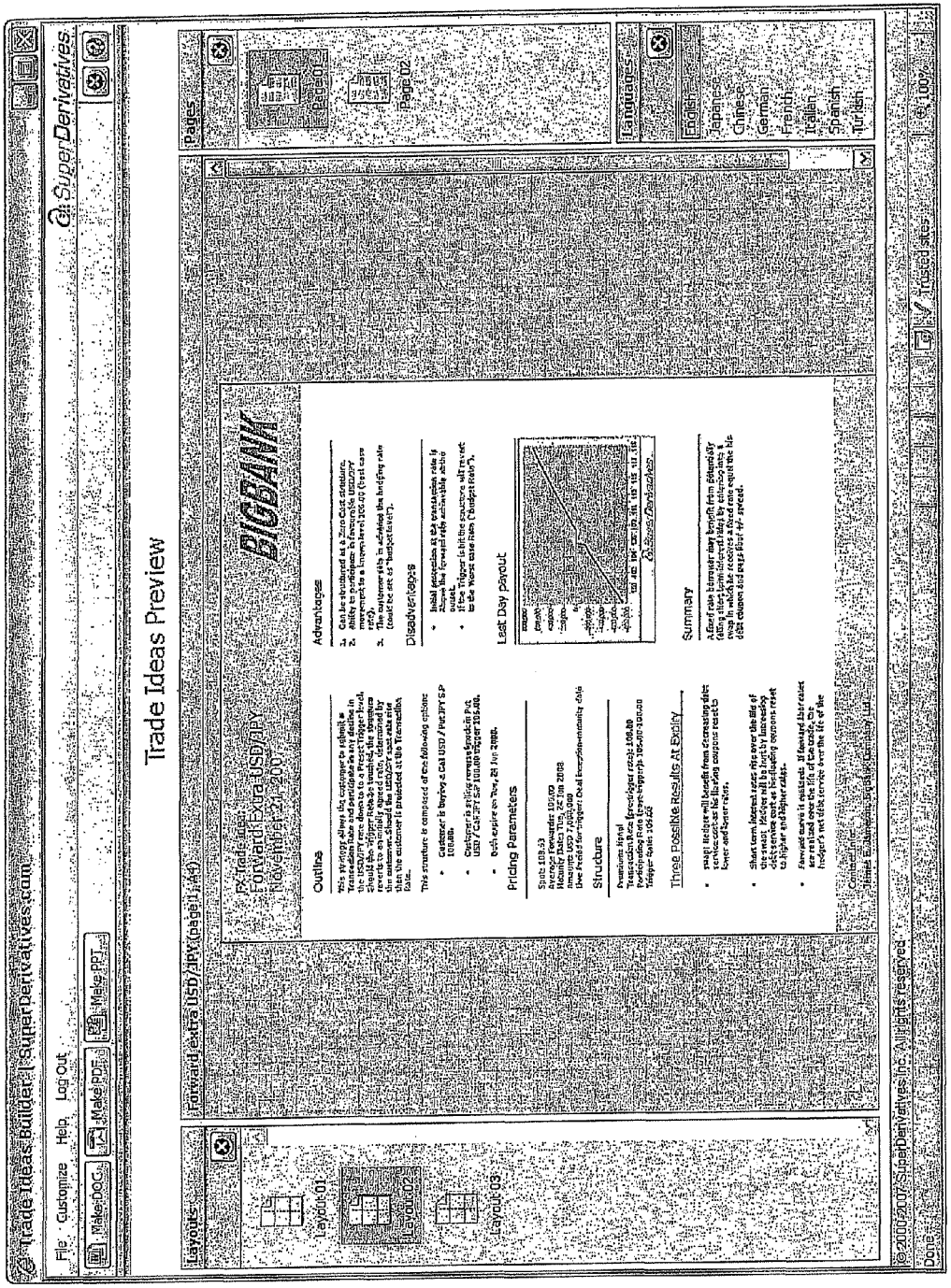
Figure 10:
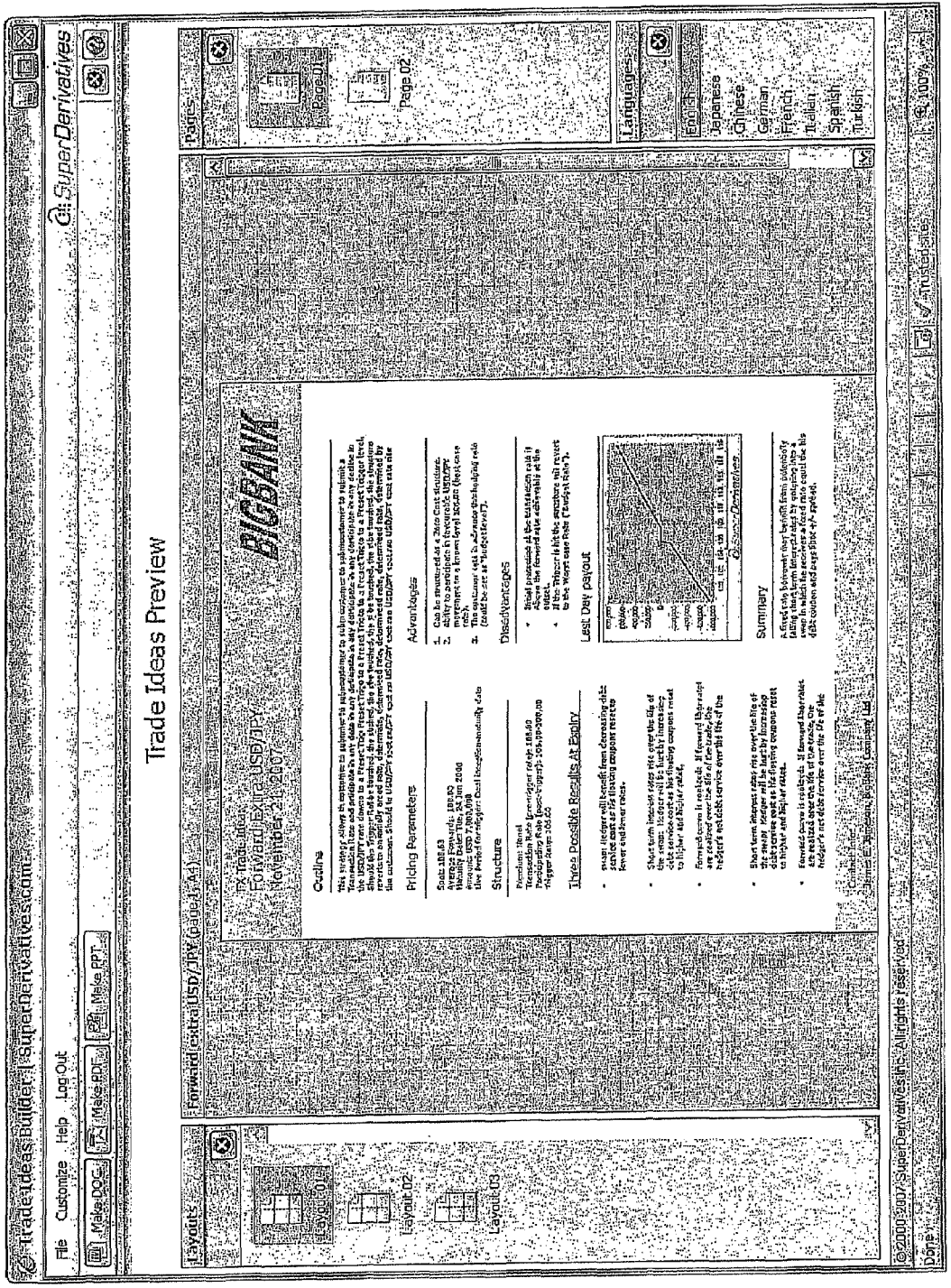
Figure 11:
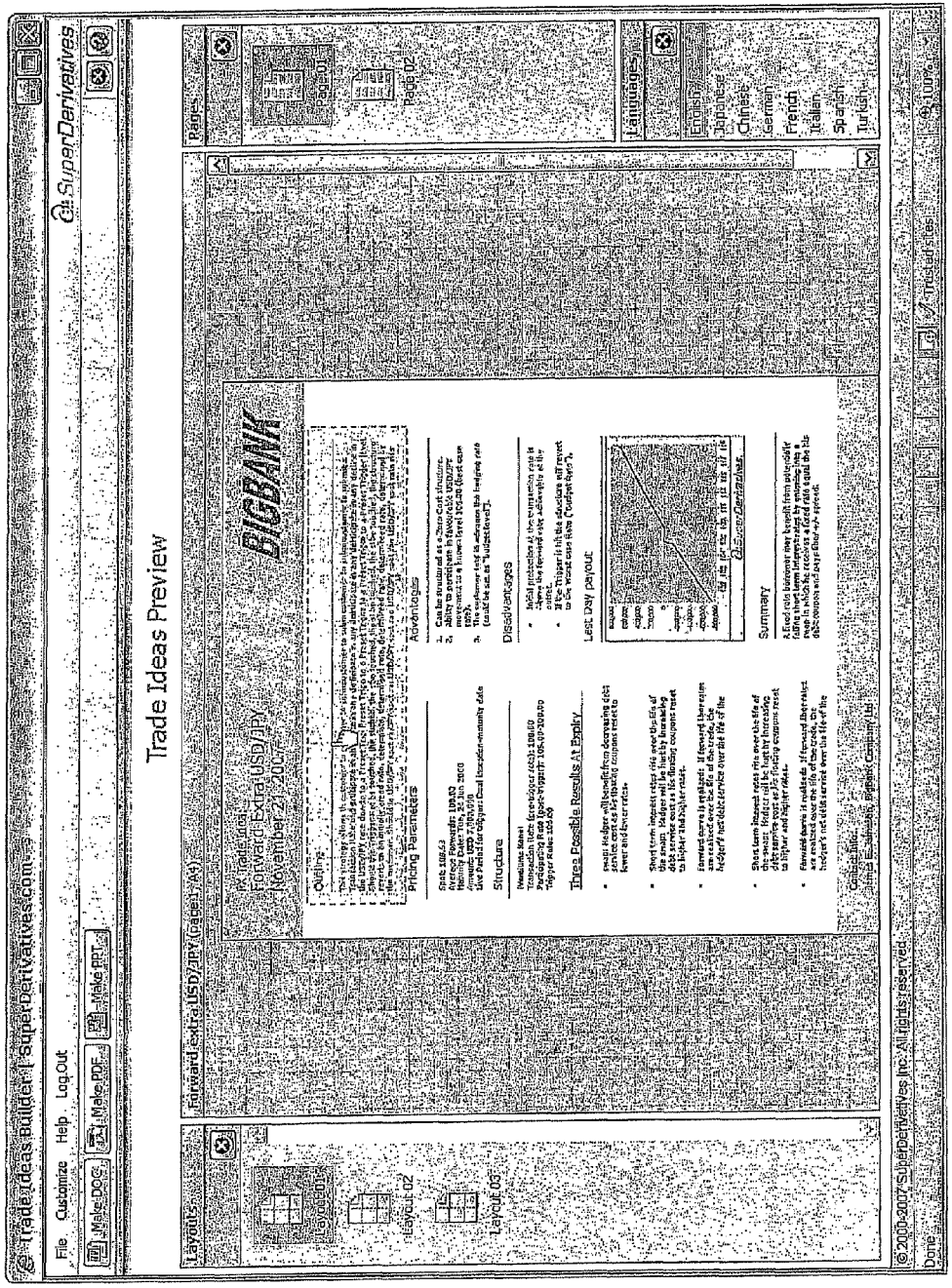
Figure 12:
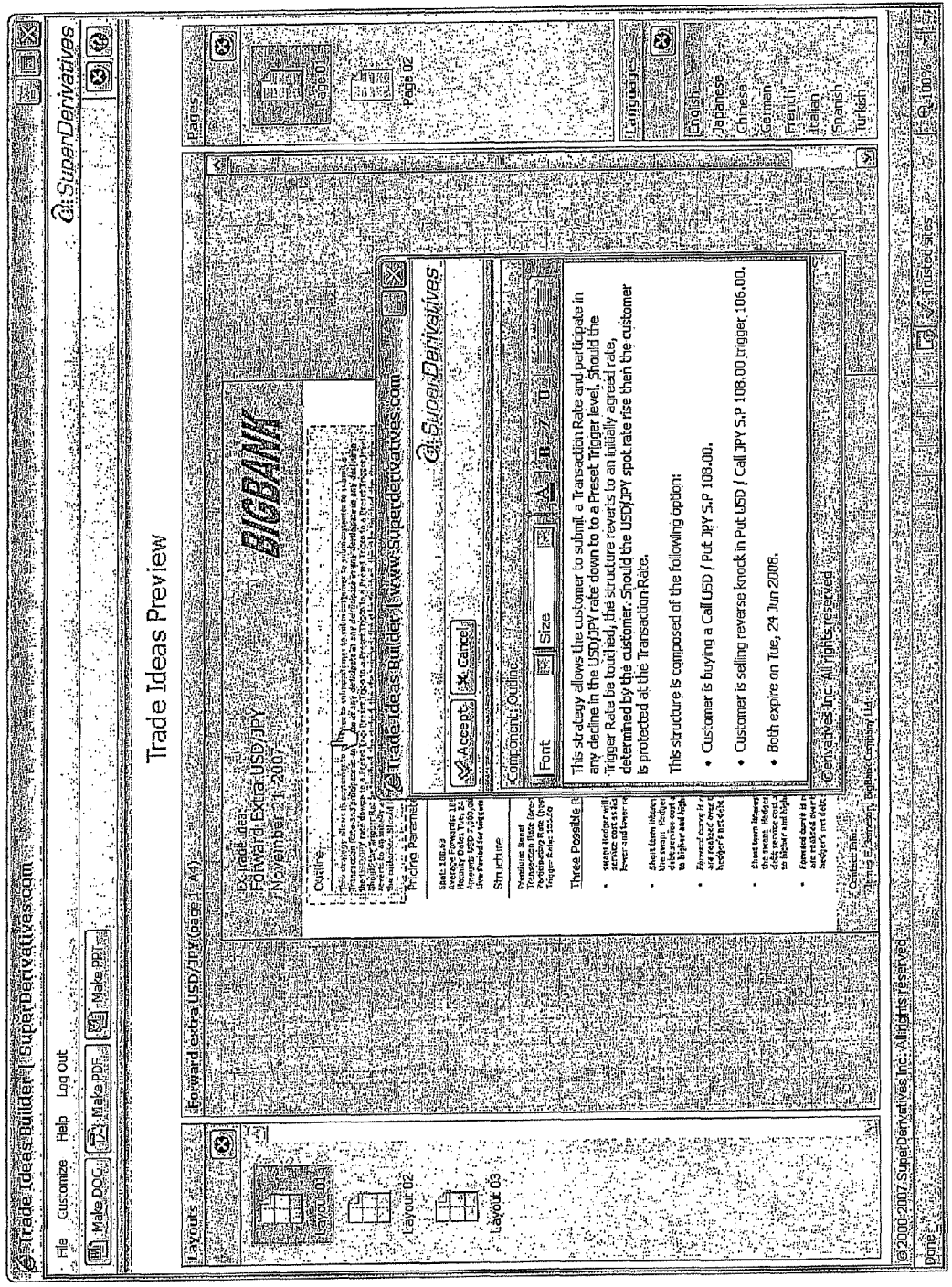
Figure 13:
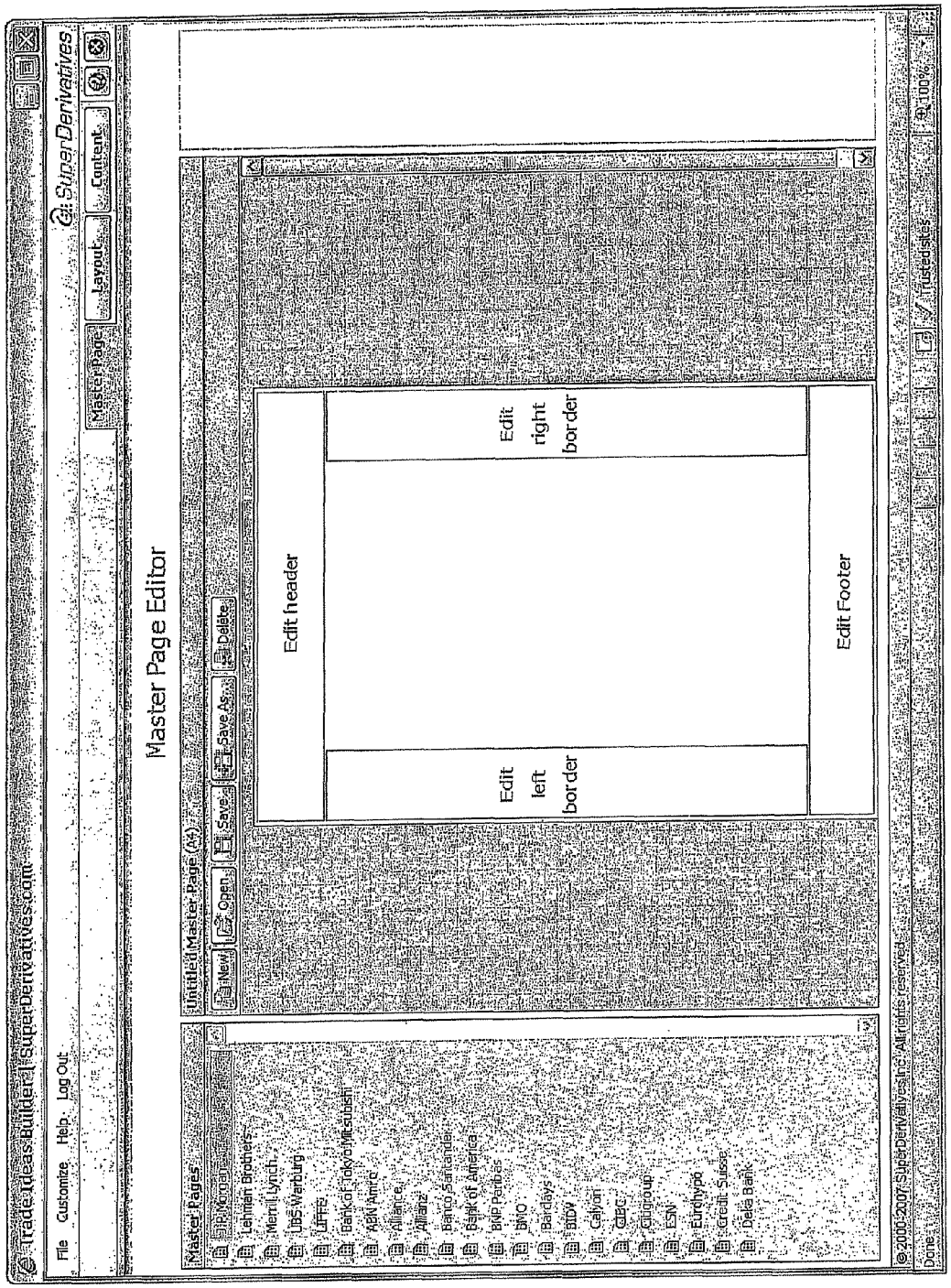
FIGS. 13-24 are schematic block diagram illustrations of interface components and trade idea generation tools, in accordance with some demonstrative embodiments.
Figure 14:
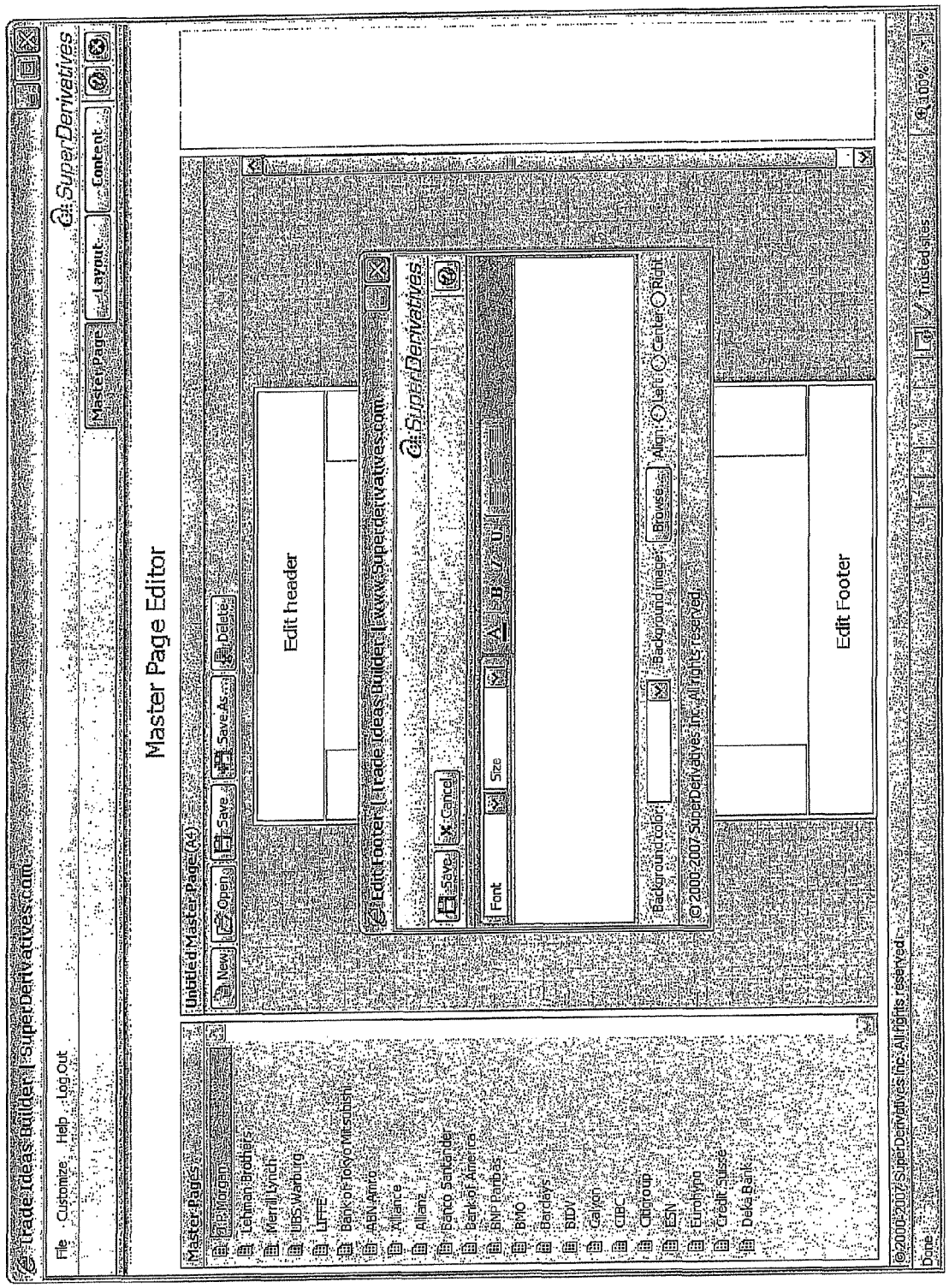
Figure 15:
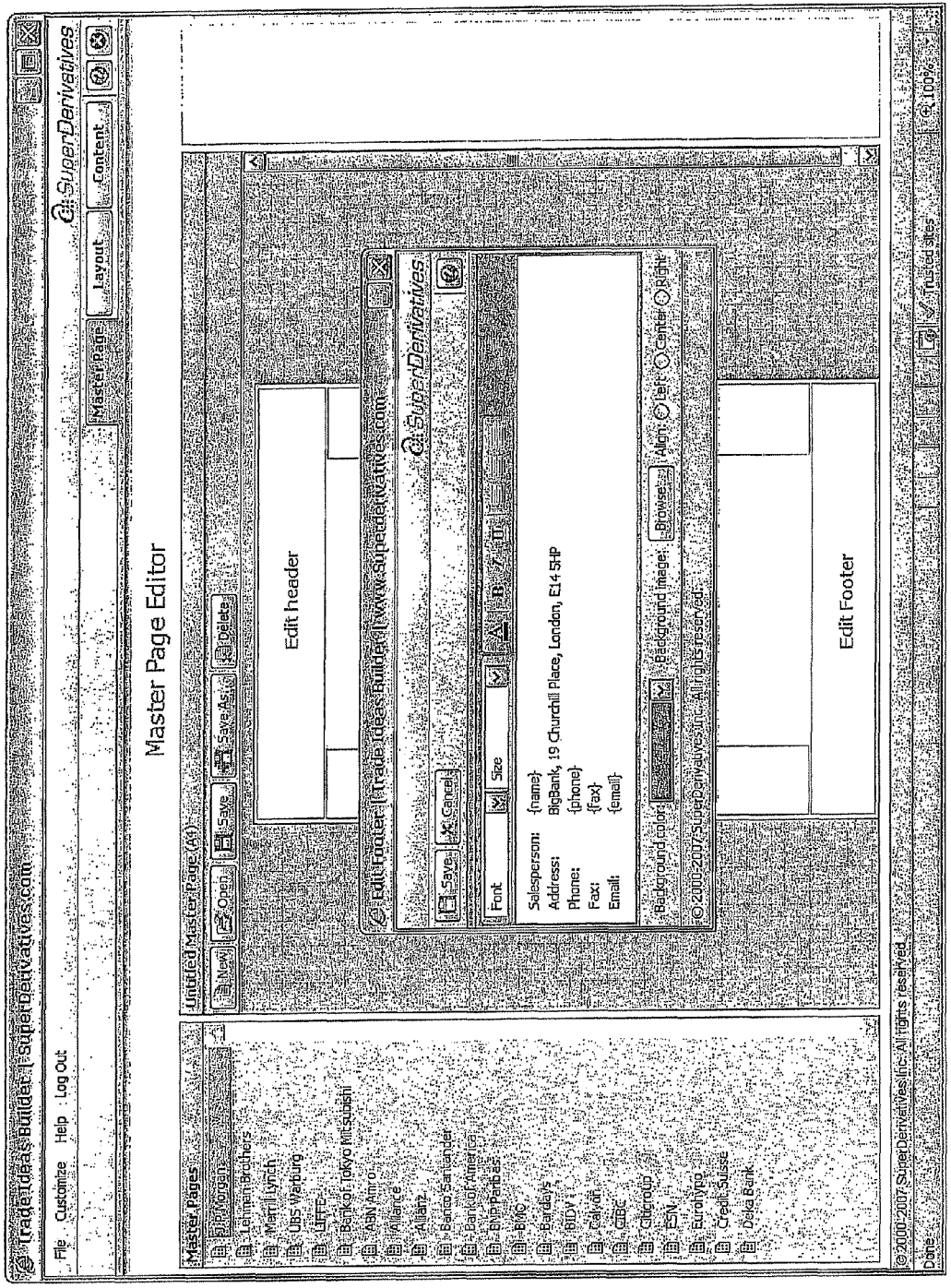
Figure 16:
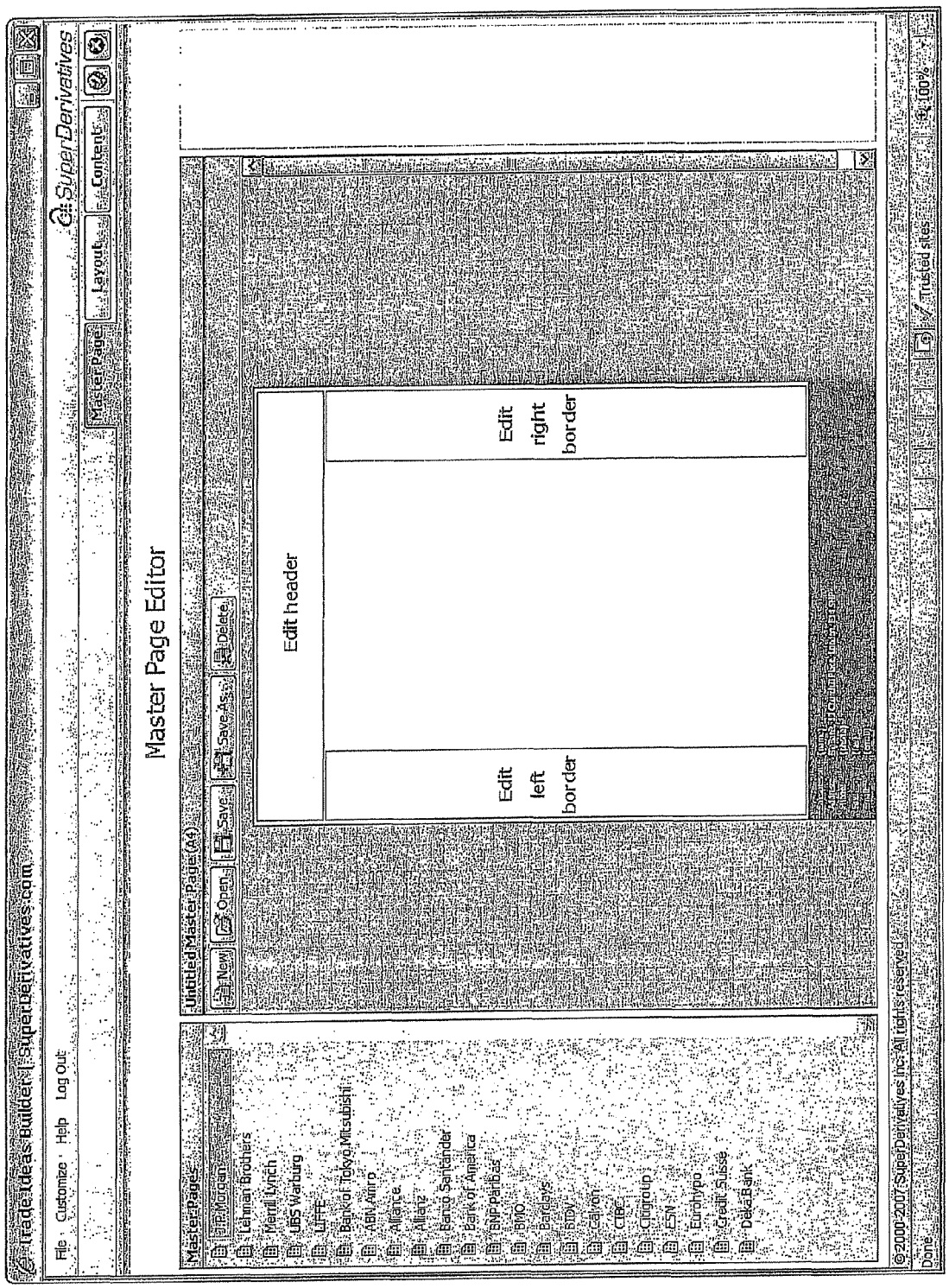
Figure 17:
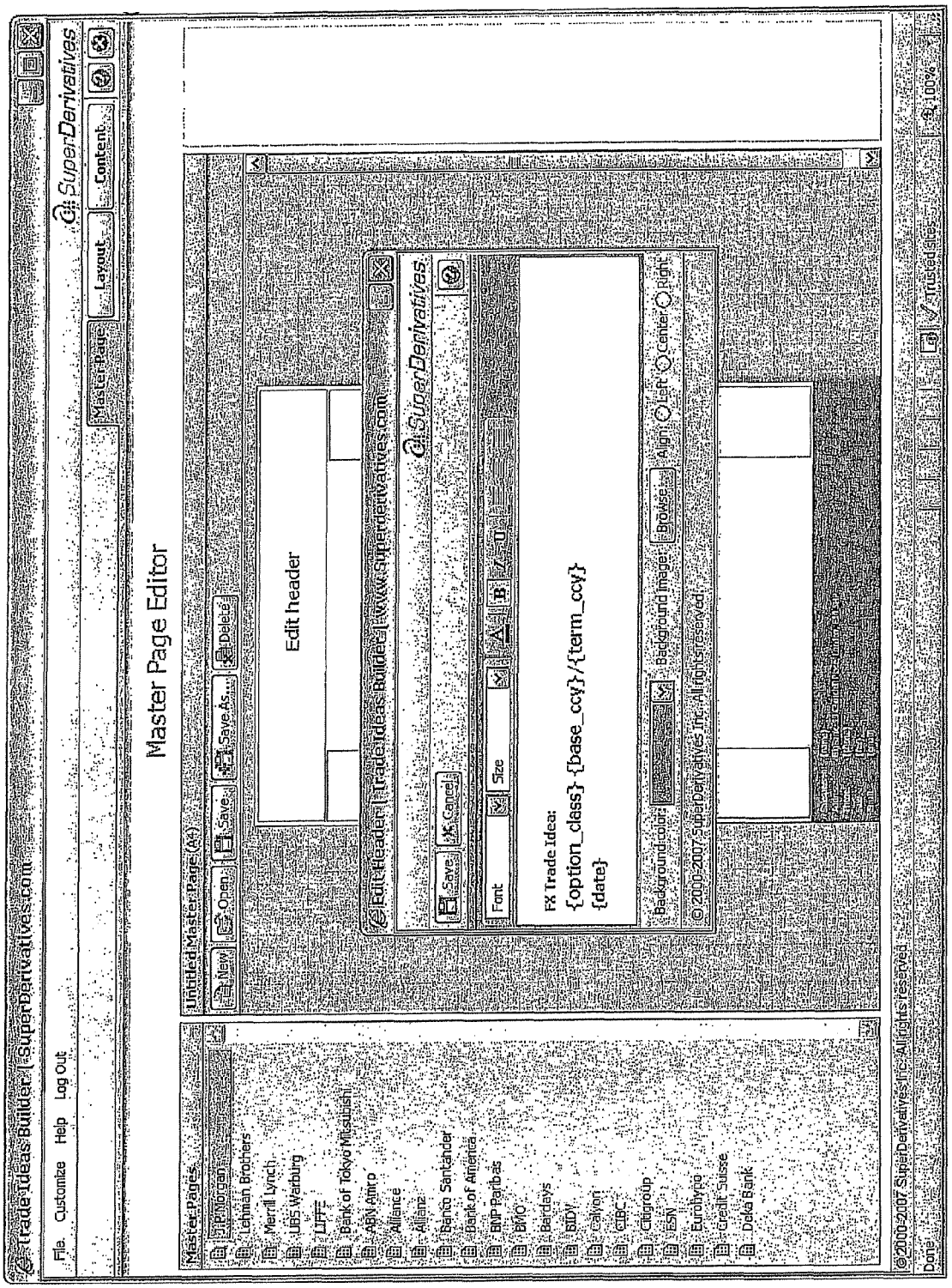
Figure 18:
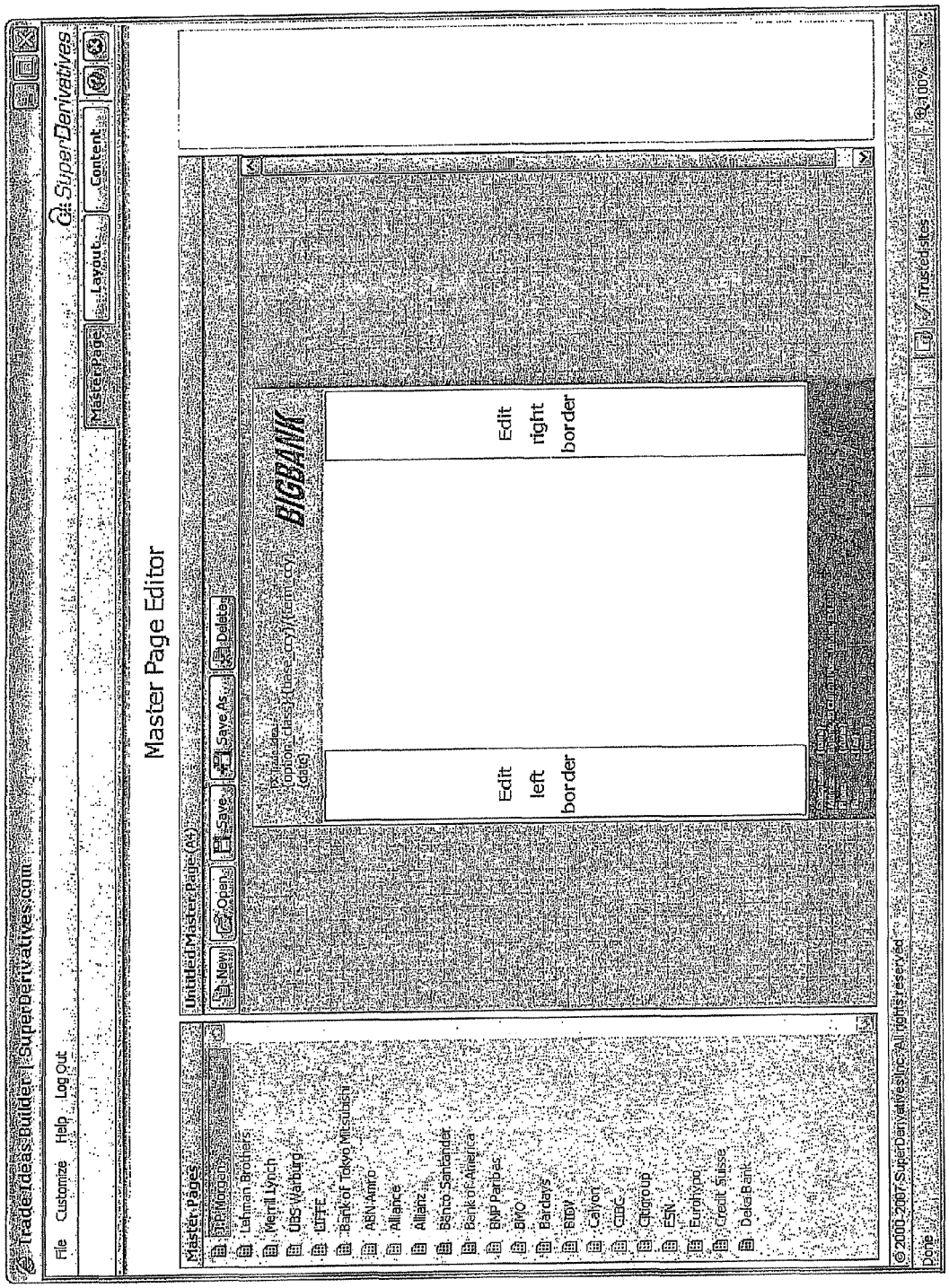
Figure 19:
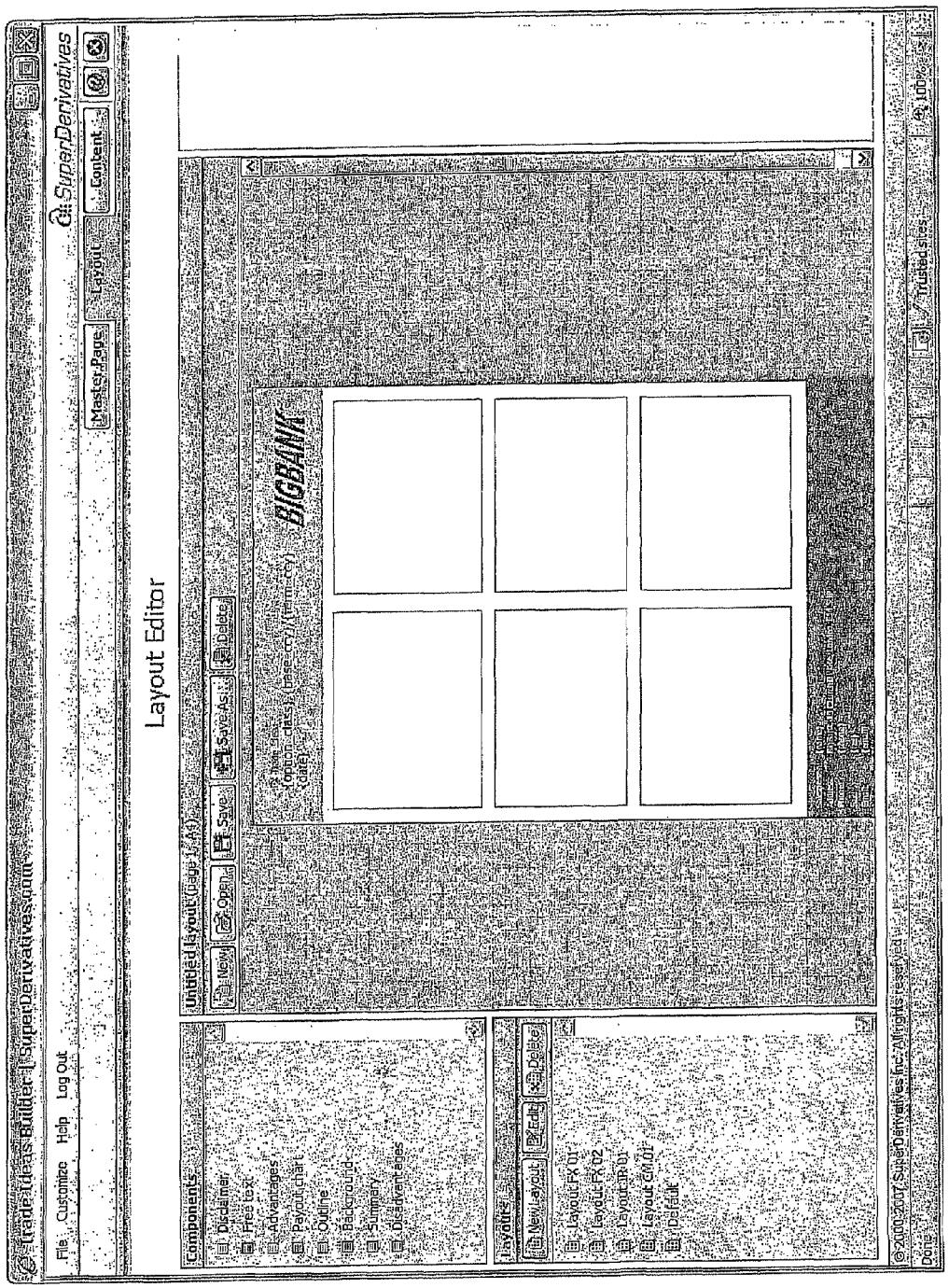
Figure 20:
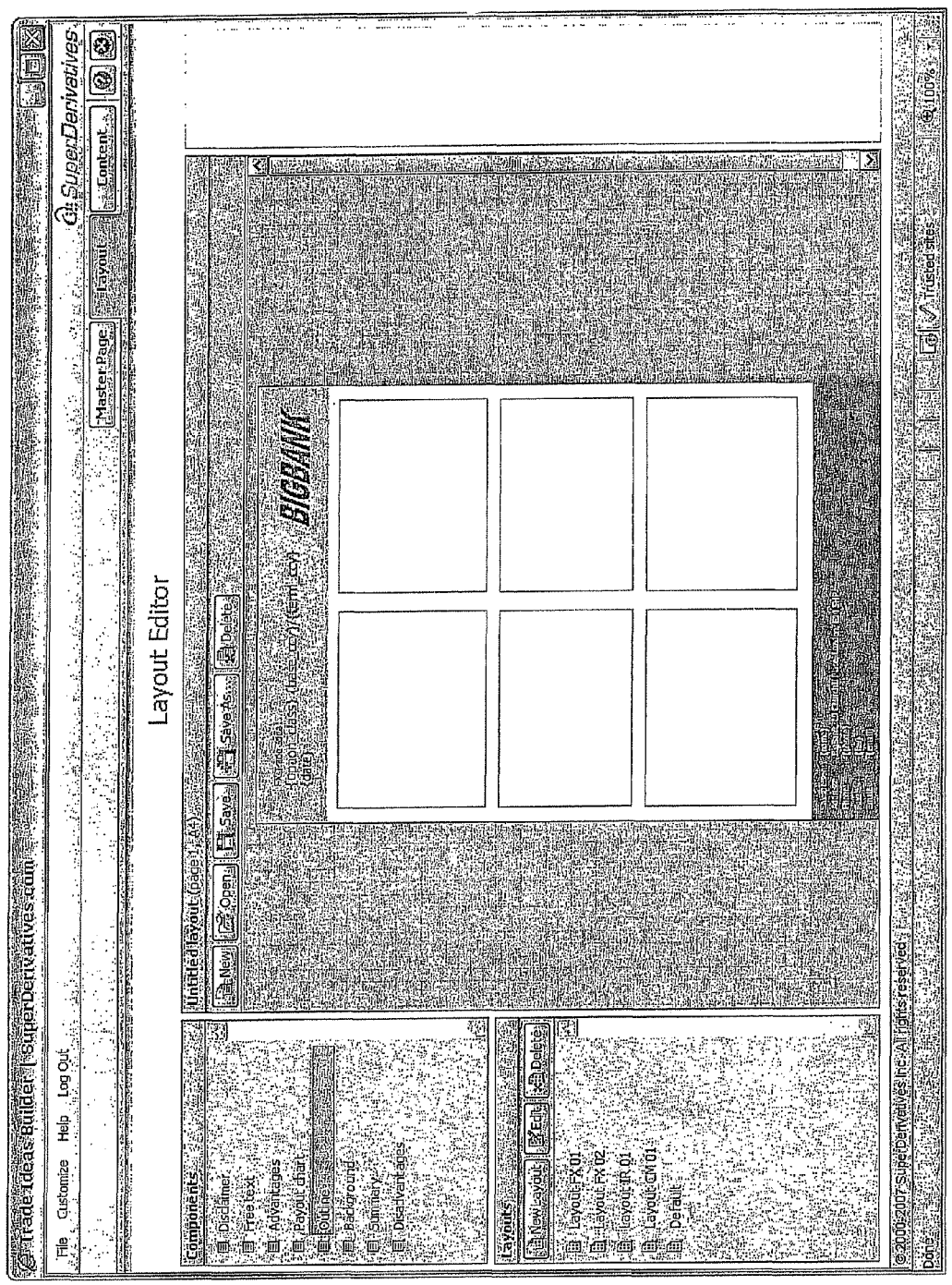
Figure 21:
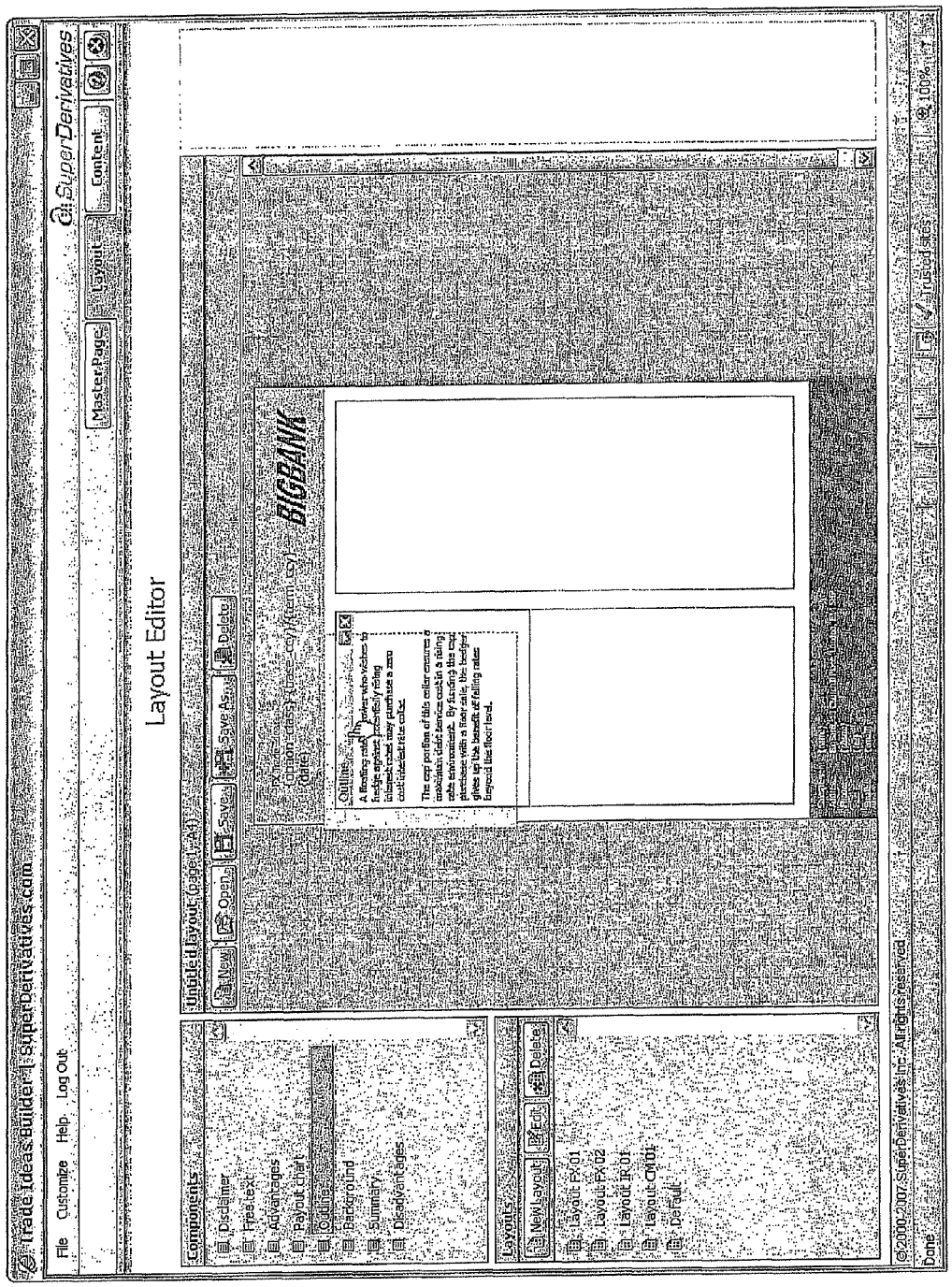
Figure 22:
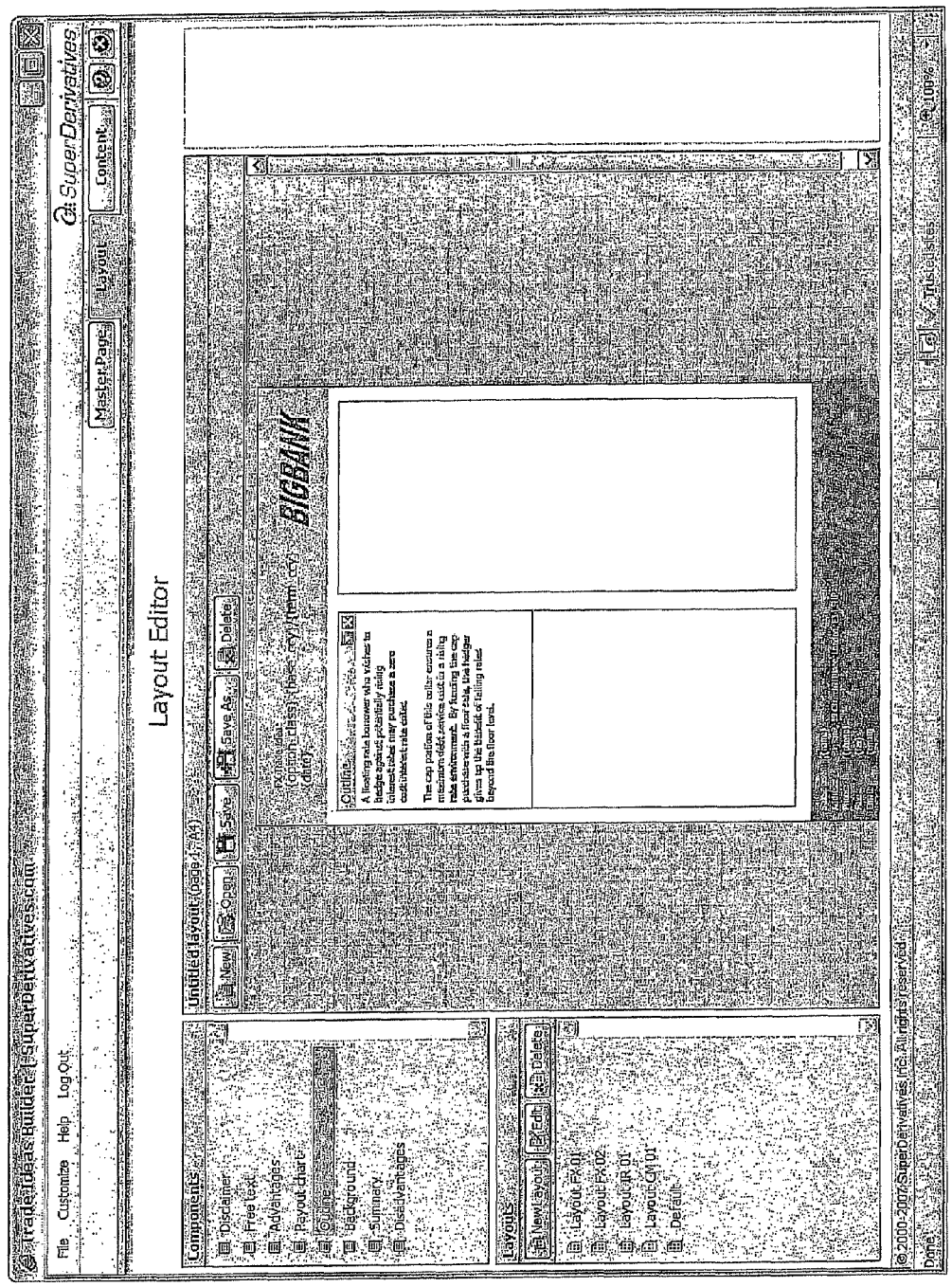
Figure 23:
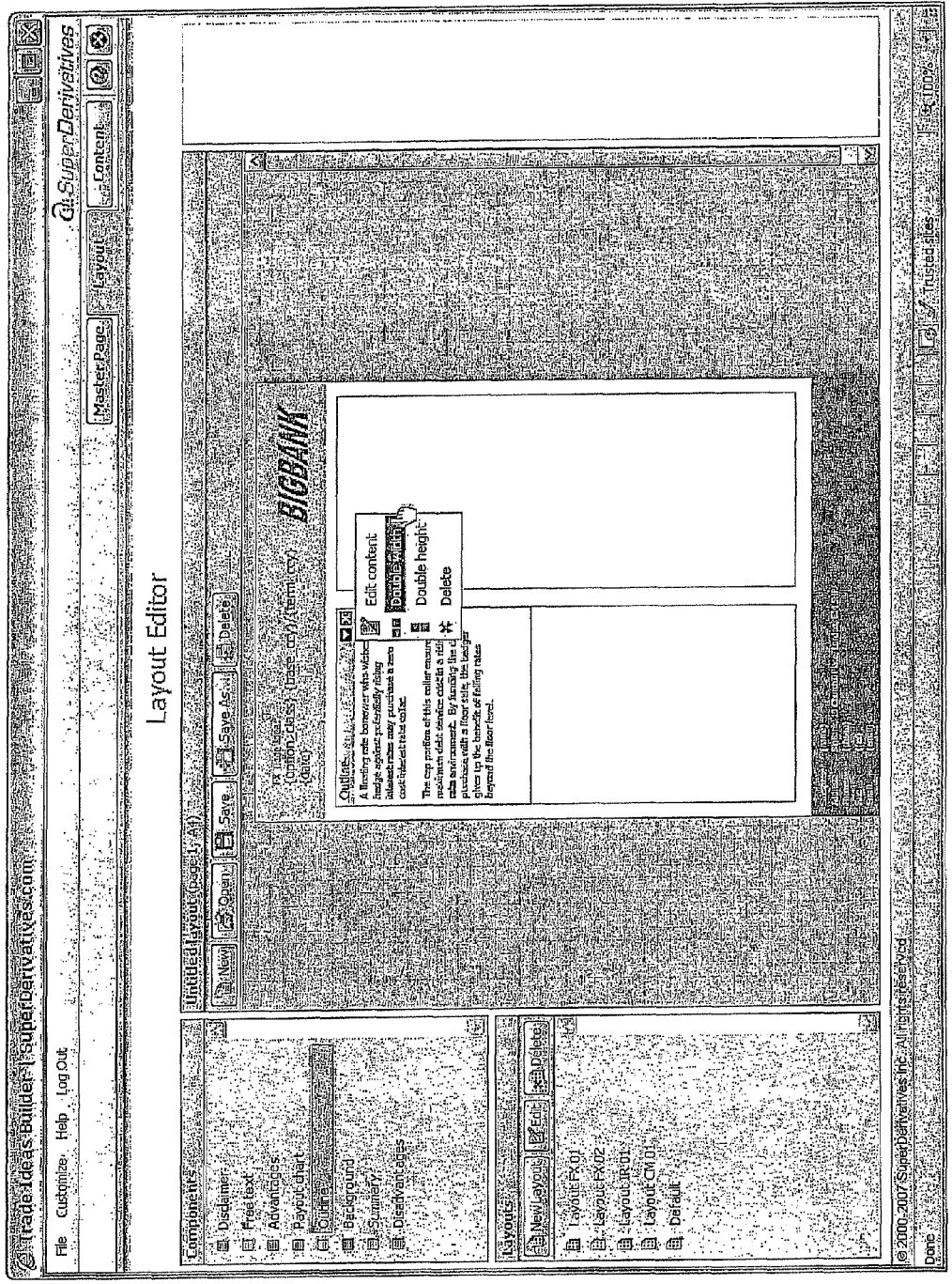
Figure 24:
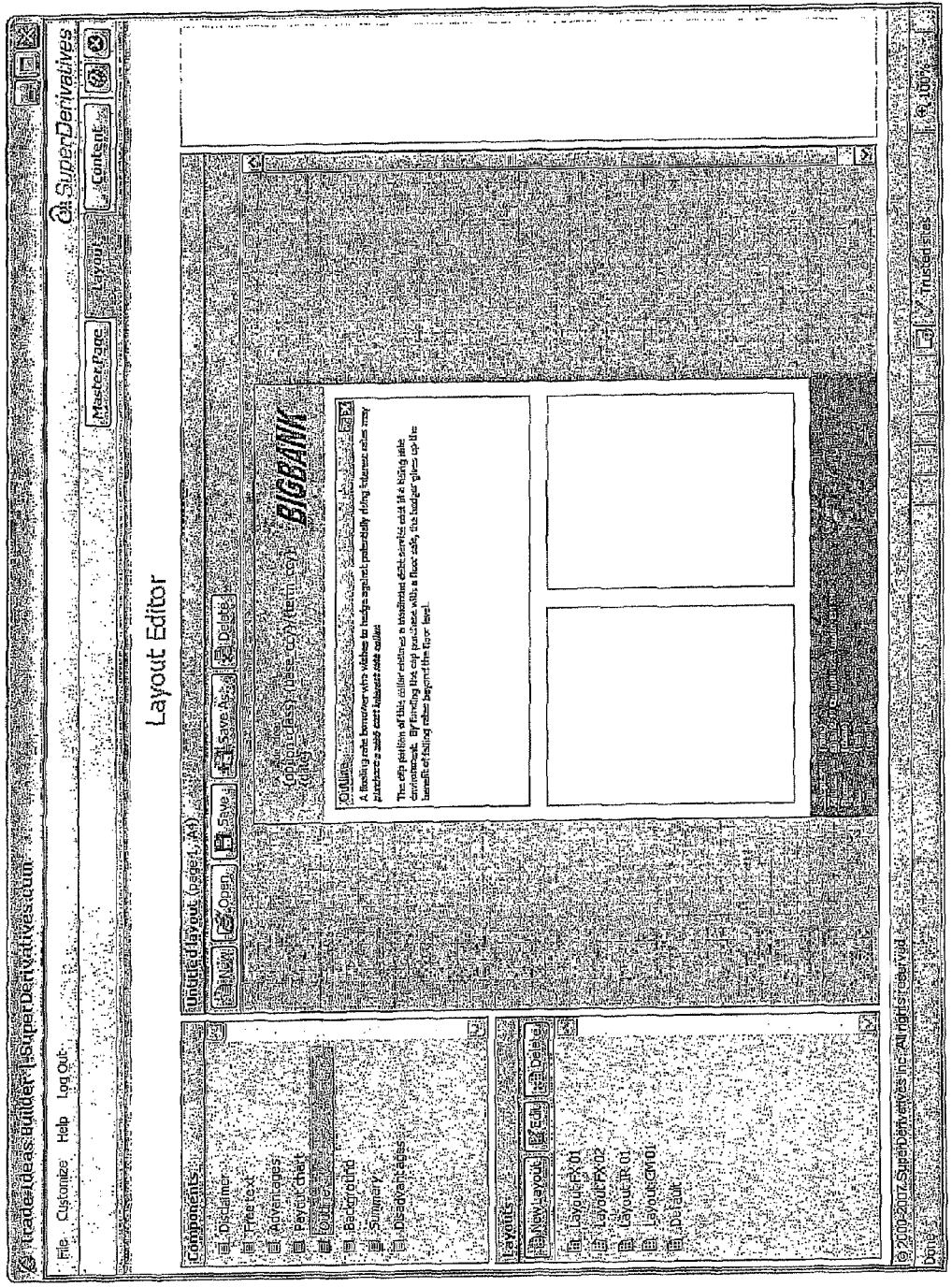
Figure 25:
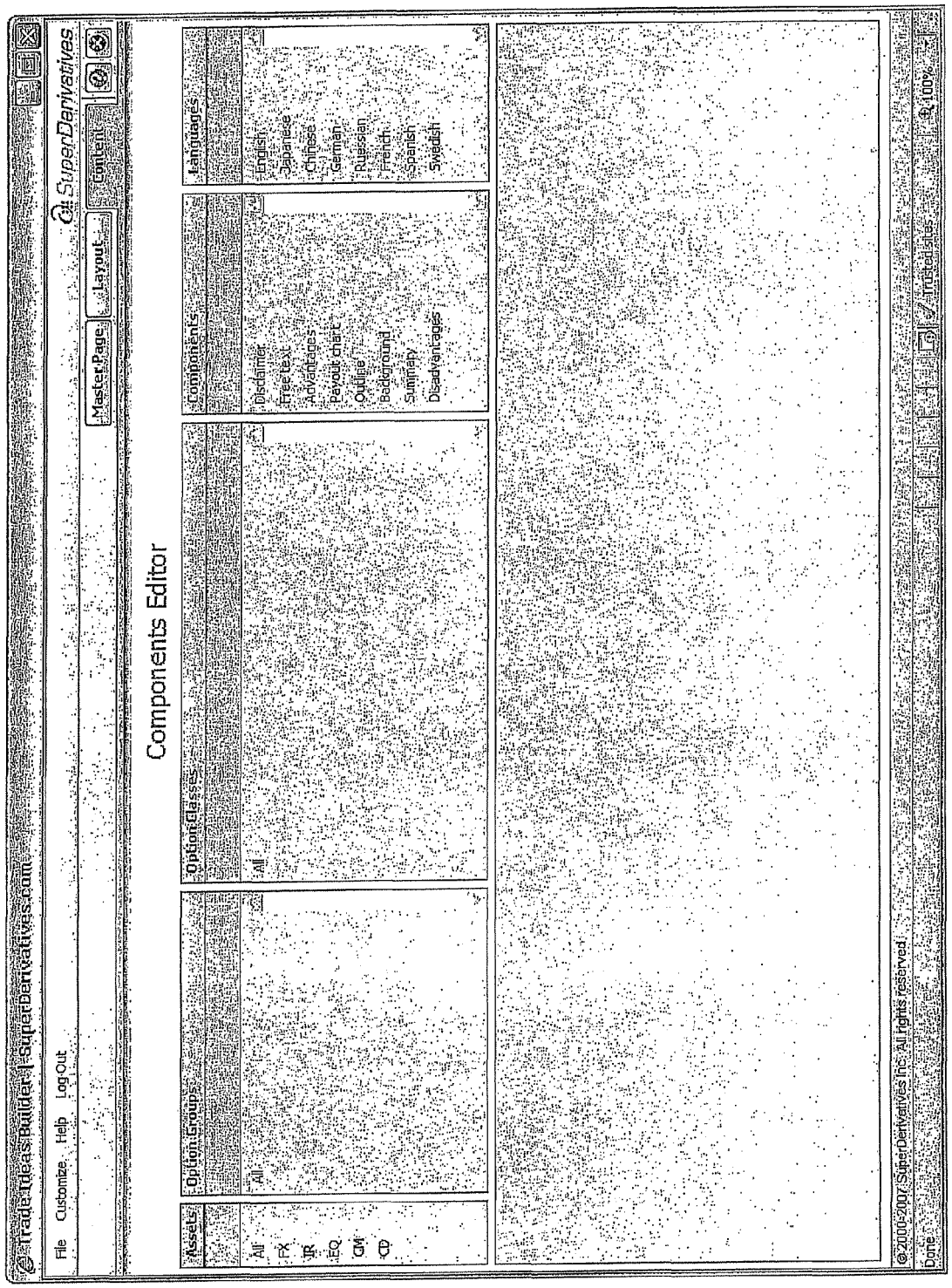
Figure 26:
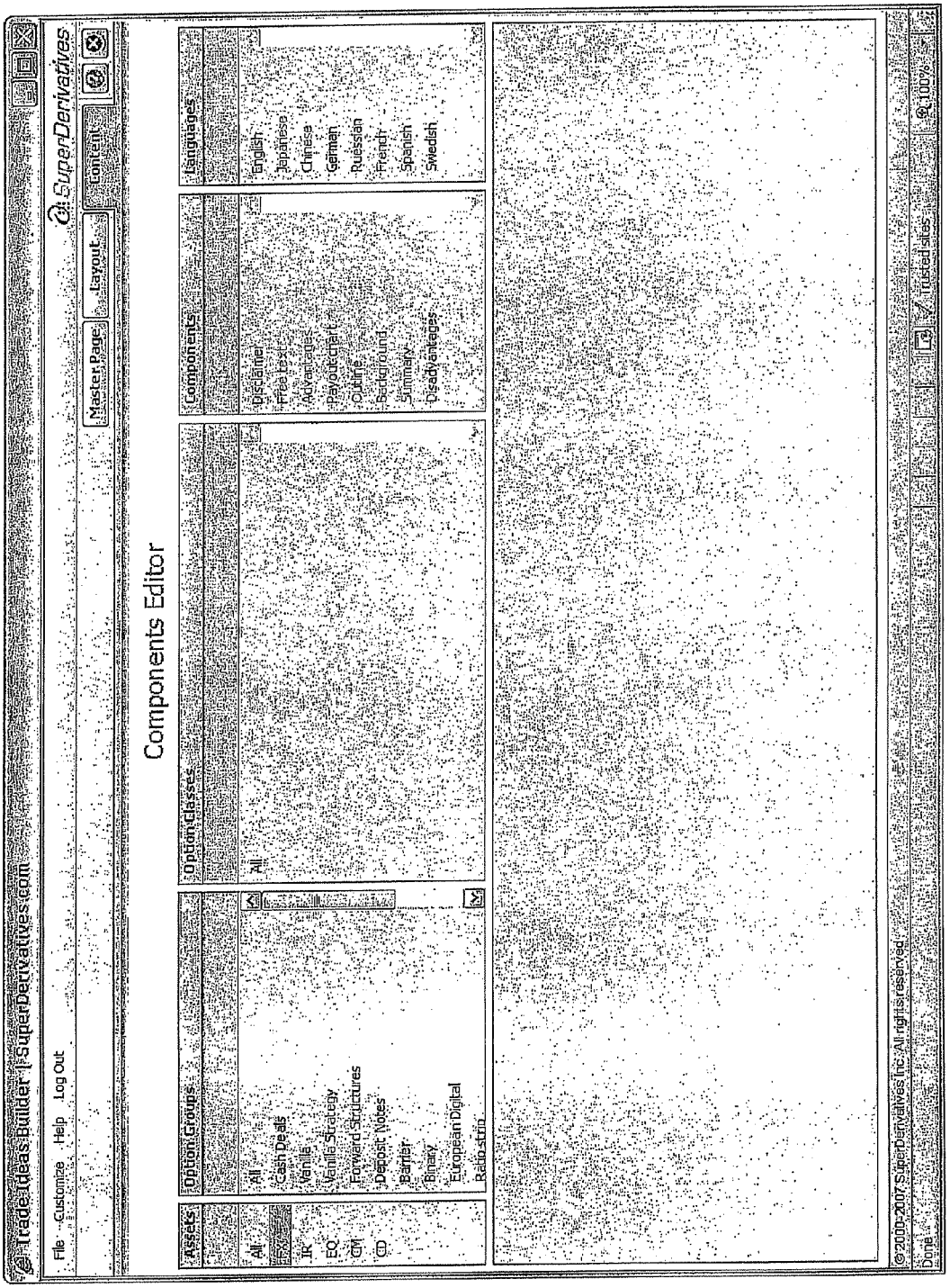
Figure 27:
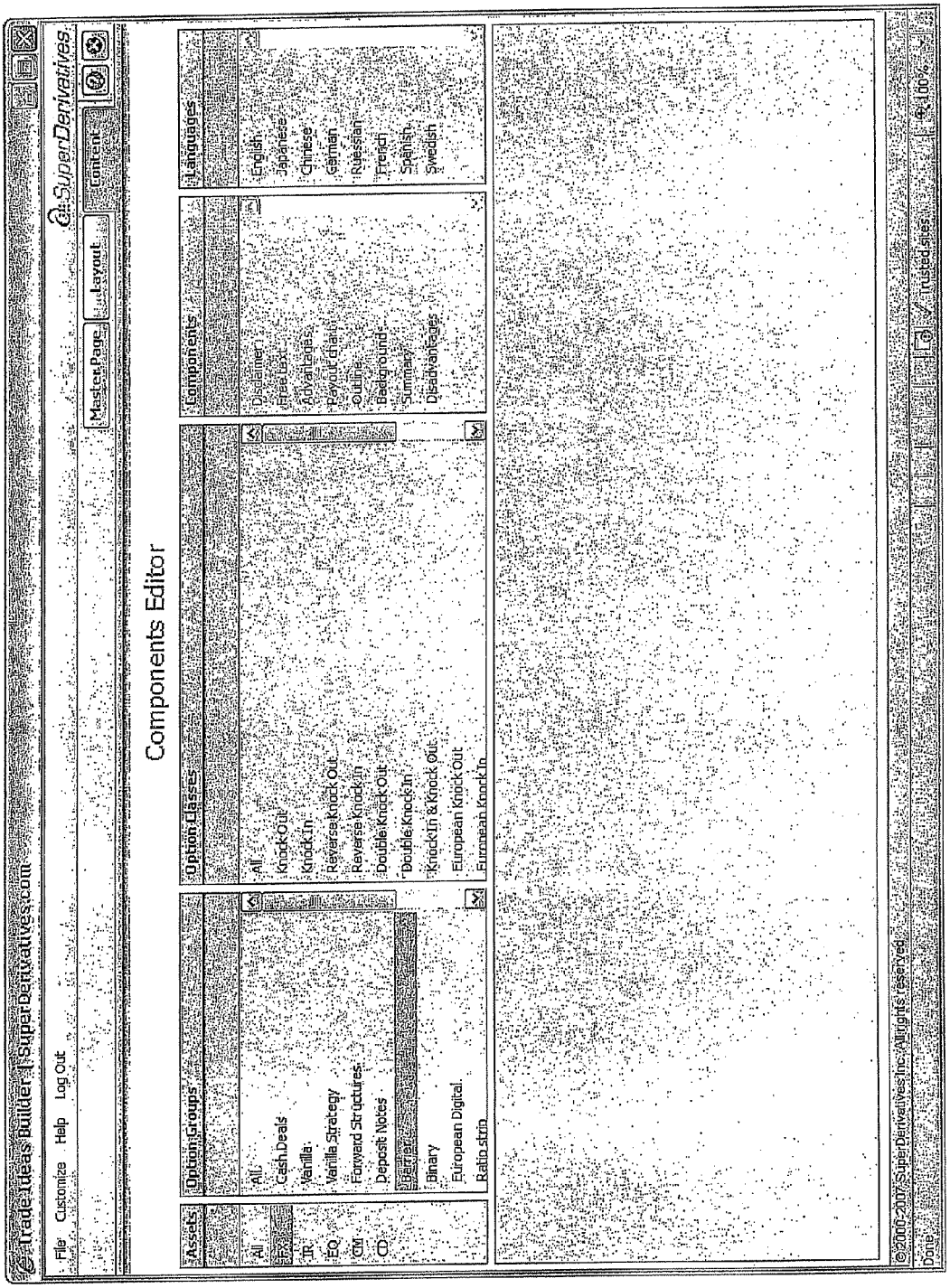
Figure 28:
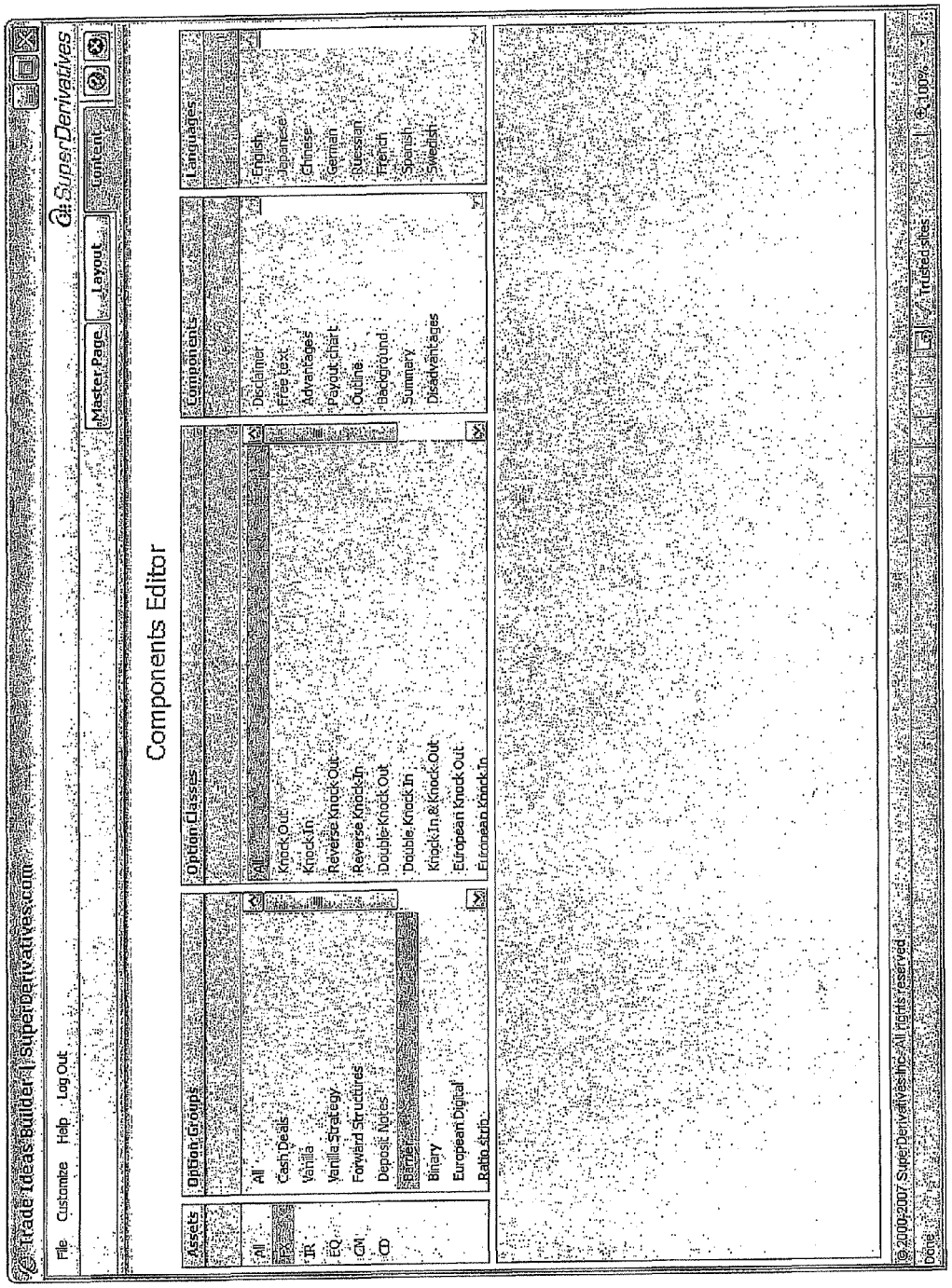
Figure 29:
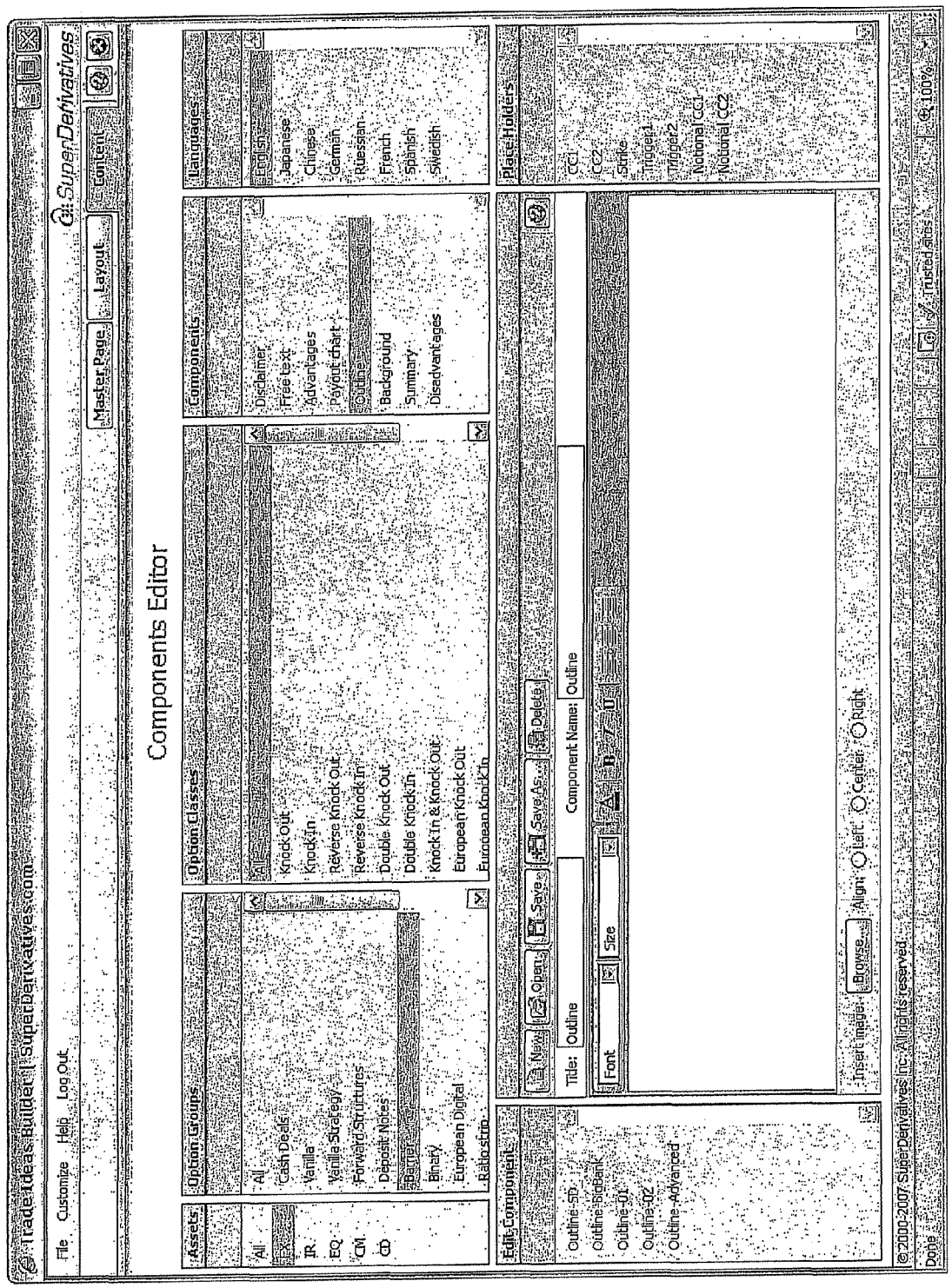

FIGS. 8-12 are schematic block diagram illustrations of interface components and trade idea generation tools in accordance with some demonstrative embodiments. For example, the user interface allows the user to define a transaction (FIG. 8A); and to receive a customized trade idea (FIG. 8B) corresponding to the transaction, e.g., including content elements selected based on the asset type "Fx", the option class "Vanilla", the English language definition, and the deal properties "Buy" and "Call". As shown in FIG. 9 the user interface may provide the user with a first customized trade idea corresponding to a transaction (FIG. 9); and a second customized trade idea corresponding to the same transaction (FIG. 10); and may allow the user to select a content elements of the selected trade idea (FIG. 11); and/or to edit the content element (FIG. 12).

FIGS. 13-24 are schematic block diagram illustrations of interface components and trade idea generation tools in accordance with some demonstrative embodiments. For example, an administrator interface allows an administrator to edit a master page (FIG. 13); to define a footer section of the master page (FIGS. 14-16); to define a header section of the master page (FIGS. 17-18); to define and edit a trade idea layout template (FIG. 19); to edit an "outline" section (FIGS. 20-24).

Figure 30:
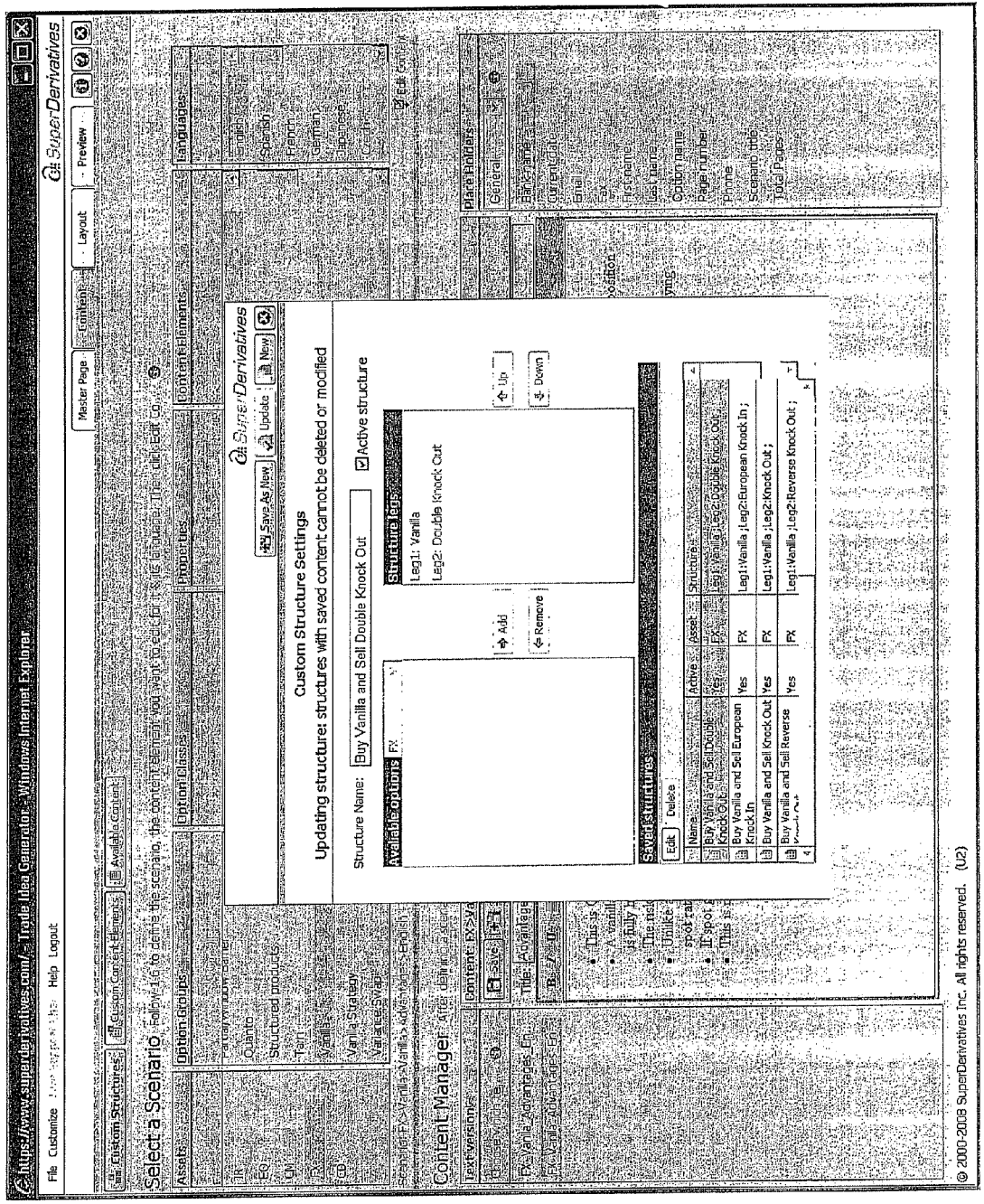
Figure 31:
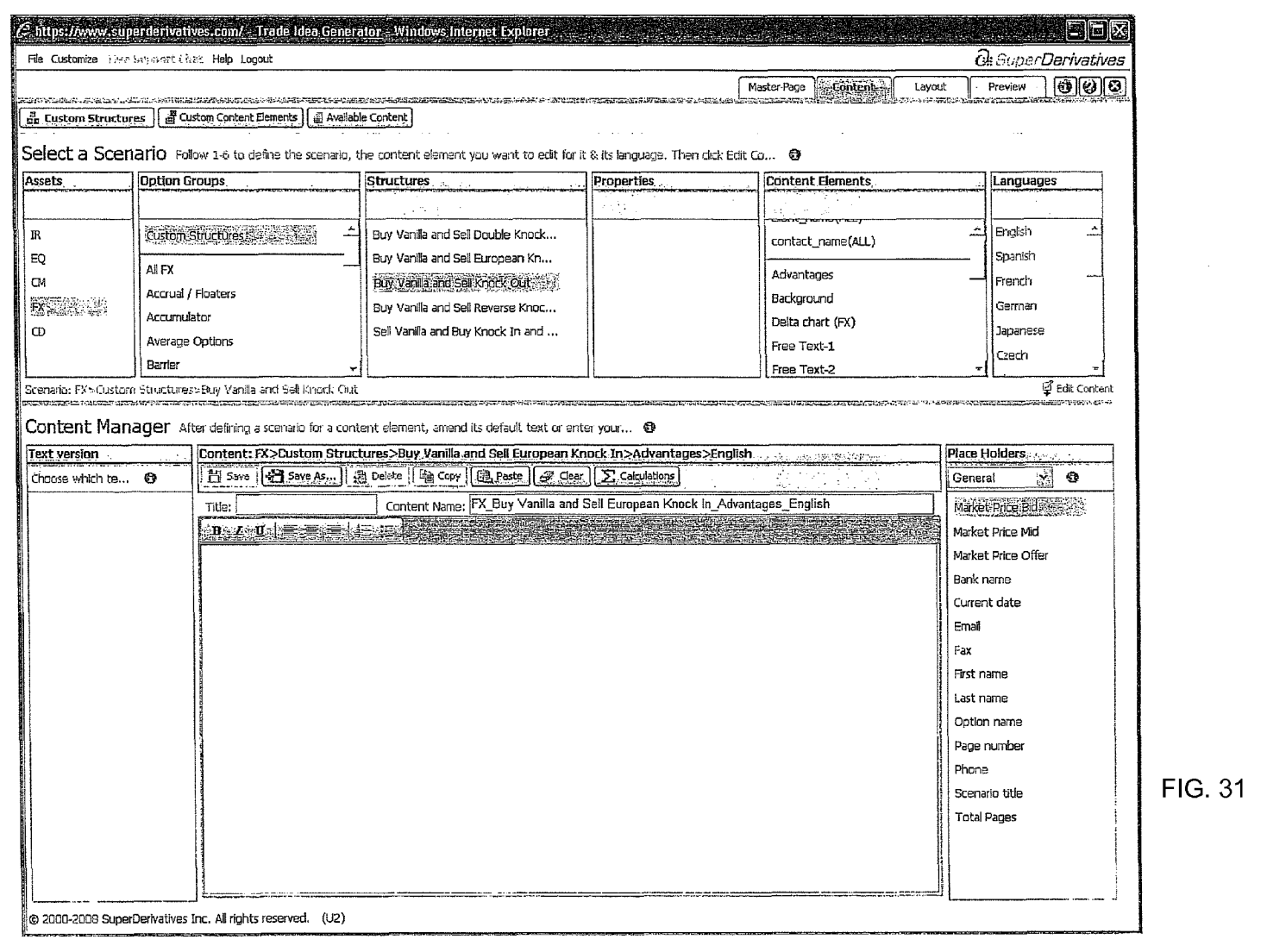
Figure 32:
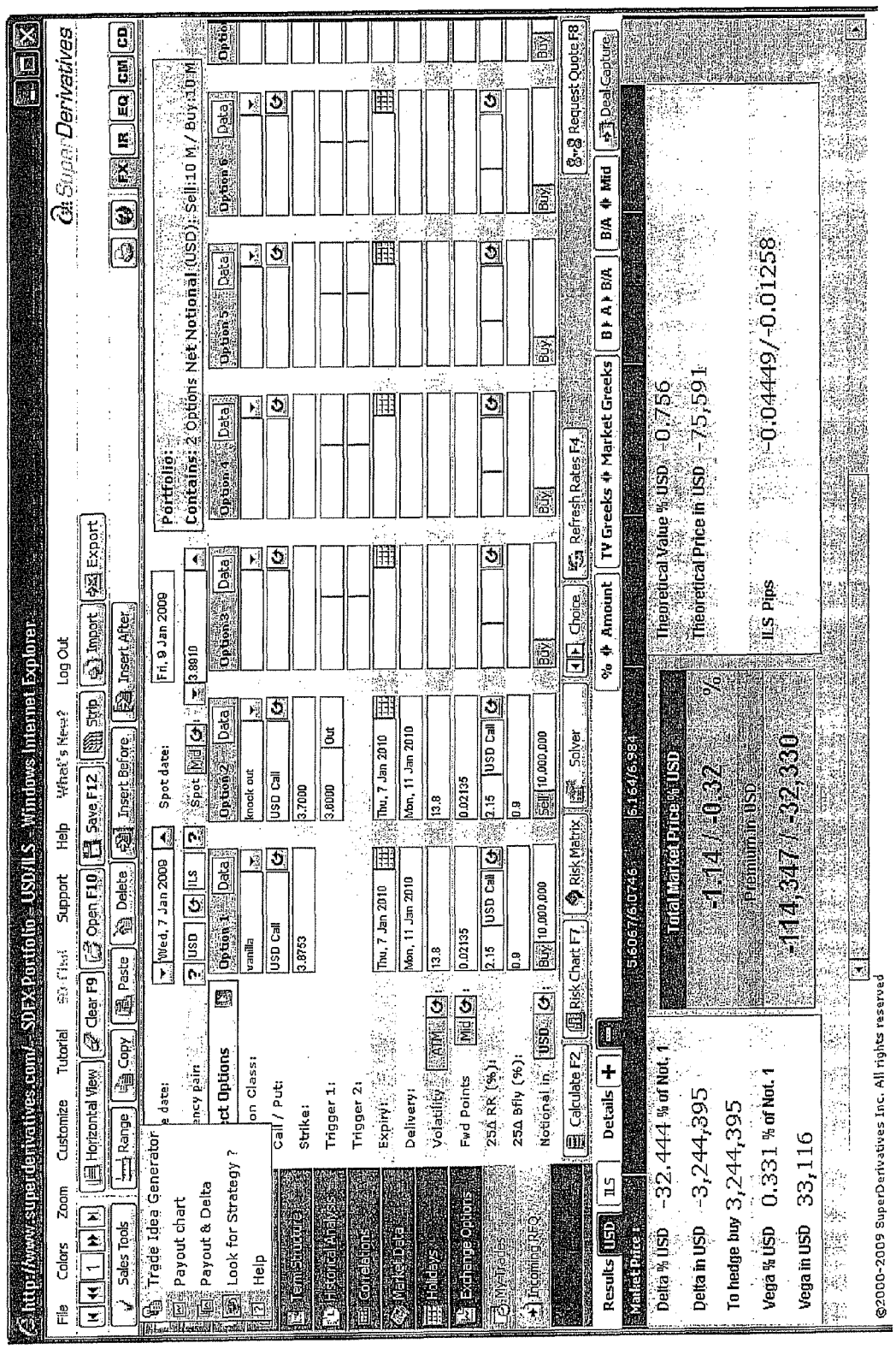
FIGS. 32 and 33 are schematic block diagram illustrations of interface components and trade idea generation tools, in accordance with some demonstrative embodiments.
Figure 33:
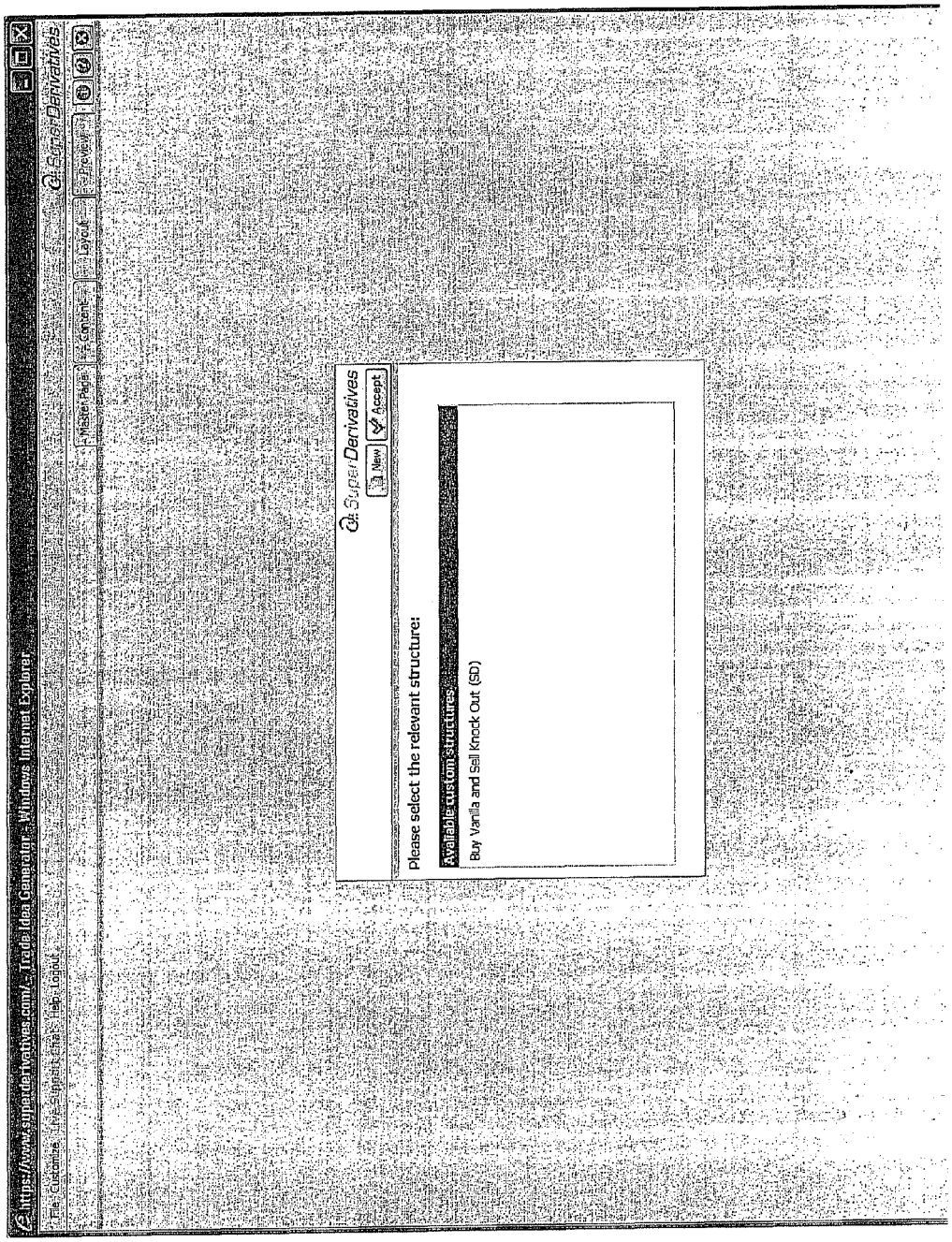

FIGS. 25-31 are schematic block diagram illustrations of content element definition interface tools in accordance with some demonstrative embodiments. For example, as shown in FIGS. 25-29, a user may define an "outline" content element corresponding to an English Fx, Barrier scenario. As shown in FIGS. 30-31, a user may define an "advantages" content element corresponding to a user-defined structured trade "Buy Vanilla and sell double Knock out". Upon structuring a trade including attributes similar to the attributes of the "Buy Vanilla and sell double Knock out" structure (FIG. 32), trade article generator application 129 (FIG. 1) may automatically prompt the user to select the corresponding structure (FIG. 33).

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of embodiments of the invention have been illustrated and described herein, many modifications, substitutions, changes, and equivalents may occur to those skilled in the art. It is, therefore, to be understood that the appended claims are intended to cover all such modifications and changes.

What is claimed is:

1. A system comprising:
a memory having stored thereon trade-article-generator instructions; and
a processor to execute the trade-article-generator instructions resulting in a trade-article generator application,
wherein the trade-article-generator application is to receive a plurality of strategy parameters defining strategy requirements with respect to one or more financial assets,
wherein the trade-article-generator application is to automatically determine at least one trade based on the strategy parameters, the strategy parameters include at least one parameter selected from the group consisting of a base currency, a strategy currency, a strategy interest rate, a strategy asset, an expiration date, a notional amount, a maximal allowed cost of the trade, and a maximal allowed loss resulting from the trade,
wherein the trade-article-generator application is to determine trade information defining the trade, the trade information including a plurality of values of one or more trade-related parameters defining the trade with respect to at least one financial instrument,
wherein the trade-article generator application is to automatically generate a customized electronic trade article corresponding to the trade based on a predefined trade-article layout,
wherein the trade-article layout defines one or more sections to include one or more respective content elements,
wherein, based on the trade information, the trade-article generator application is to automatically select, for at least one of the sections, a predefined content element to be included in the section from a plurality of predefined content elements corresponding to the section,
and wherein the trade-article generator application is to generate the customized electronic trade article including the at least one selected content element.

2. The system of claim 1, wherein the plurality of predefined content elements correspond to a respective plurality of trade scenarios, each trade scenario including a different combination of one or more attributes selected from one or more predefined sets of attribute types.

3. The system of claim 2, wherein the trade-article generator application is to select the content element corresponding to a trade scenario including at least the same asset type and the same derivative-strategy group as an asset type and an derivative-strategy group of the trade, respectively.

4. The system of claim 2, wherein the predefined sets of attribute types include at least one set of attribute types selected from the group consisting of a predefined set of one or more asset-type attributes, a predefined set of one or more derivative-strategy group attributes, a predefined set of one or more derivative class attributes, and a predefined set of one or more transaction attributes.

5. The system of claim 4, wherein the set of asset type attributes includes at least one asset type attribute selected from the group consisting of a foreign exchange asset, an interest rate asset, a credit asset, a commodity asset, and an equity asset.

6. The system of claim 1, wherein the at least one trade includes a structured trade including a plurality of trades with respect to a plurality of instruments, and wherein the trade-article generator application is to automatically select the content element to be included within the section based on one or more attributes of the structured trade.

7. The system of claim 6, wherein the trade-article generator application is to automatically select the content element based on at least one criterion selected from the group consisting of a number of the instruments, an order of two or more of the instruments, and a type of one or more of the instruments.

8. The system of claim 1, wherein the trade-article generator application is to provide a user with a plurality of predefined trade-article layouts, and to generate the customized electronic trade article based on a selected trade-article layout, which is selected by the user from the plurality of layouts.

9. The system of claim 1, wherein the trade-article generator application is to redefine one or more of the sections based on instructions received from a user.

10. The system of claim 9, wherein the trade-article generator application is to allow the user to perform at least one operation selected from the group consisting of rearranging a layout of the plurality of sections, formatting one or more of the sections, and modifying the content of one or more of the sections.

11. The system of claim 1, wherein the trade-article generator application is to define one or more layout attributes of the trade-article layout based on a predefined layout master page.

12. The system of claim 11, wherein the layout attributes include at least one attribute selected from the group consisting of a page-orientation of the trade-article layout, one or more page margins of the trade-article layout, one or more attributes of a header of the trade-article layout, one or more attributes of a footer of the trade-article layout, a language of the trade-article layout, and one or more attributes of a logo to be included in the trade-article layout.

13. The system of claim 1, wherein the trade article includes a trade idea.

14. The system of claim 1, wherein the plurality of sections include at least one section selected from the group consisting of an outline section including an outline of the trade; a pricing section including one or more pricing parameters of the trade; an advantages section describing one or more advantages of the trade; a disadvantages section describing one or more disadvantages of the trade; at least one chart section including one or more charts corresponding to the trade; a disclaimer section including one or more disclaimers; and a summary section including a summary of the trade.

15. A system comprising:
a memory having stored thereon instructions; and
a processor to execute the instructions resulting in an application,
wherein the application is to receive a plurality of strategy parameters defining strategy requirements with respect to one or more financial assets,
wherein the application is to automatically determine at least one trade based on the strategy parameters, the strategy parameters include at least one parameter selected from the group consisting of a base currency, a strategy currency, a strategy interest rate, a strategy asset, an expiration date, a notional amount, a maximal allowed cost of the trade, and a maximal allowed loss resulting from the trade,
wherein the application is to determine trade information defining the trade, the trade information including a plurality of values of one or more trade-related parameters defining the trade with respect to at least one financial instrument,
wherein the application is to automatically generate a customized electronic trade article corresponding to the trade based on a predefined trade-article layout,
wherein the trade-article layout defines one or more sections to include one or more respective content elements,
wherein at least one of the content elements includes one or more placeholders to present the trade-related parameters,
and wherein the application is to generate the customized electronic trade article including the one or more content elements by inserting the values of the trade-related parameters into the one or more placeholders.

16. The system of claim 15, wherein, based on one or more attributes of the trade, the application is to automatically select from a plurality of predefined content elements corresponding to a section a content element to be included within the section.

17. The system of claim 16, wherein the plurality of predefined content elements correspond to a respective plurality of trade scenarios, each trade scenario including a different combination of one or more attributes selected from one or more predefined sets of attribute types.

18. The system of claim 17, wherein the application is to select the content element corresponding to a trade scenario including at least the same asset type and the same derivative-strategy group as an asset type and an derivative-strategy group of the trade, respectively.

19. The system of claim 17, wherein the predefined sets of attribute types include at least one set of attributes selected from the group consisting of a predefined set of one or more asset-type attributes, a predefined set of one or more derivative-strategy group attributes, a predefined set of one or more derivative class attributes, and a predefined set of one or more transaction attributes.

20. The system of claim 16, wherein the at least one trade includes a structured trade including a plurality of trades with respect to a plurality of instruments, and wherein the application is to automatically select the content element to be included within the section based on one or more attributes of the structured trade.

21. The system of claim 20, wherein the application is to automatically select the content element based on at least one criterion selected from the group consisting of a number of the instruments, an order of two or more of the instruments, and a type of one or more of the instruments.

22. The system of claim 15, wherein the application is to provide a user with a plurality of predefined trade-article layouts, and to generate the customized electronic trade article based on a selected trade-article layout, which is selected by the user from the plurality of layouts.

23. The system of claim 15, wherein the application is to redefine one or more of the sections based on instructions received from a user.

24. The system of claim 23, wherein the application is to allow the user to perform at least one of rearranging a layout of the plurality of sections, formatting one or more of the sections, and modifying the content of one or more of the sections.

25. The system of claim 15, wherein the application is to define one or more layout attributes of the trade-article layout based on a predefined layout master page.

26. The system of claim 25, wherein the layout attributes include at least one attribute selected from the group consisting of a page-orientation of the trade-article layout, one or more page margins of the trade-article layout, one or more attributes of a header of the trade-article layout, one or more attributes of a footer of the trade-article layout, a language of the trade-article layout, and one or more attributes of a logo to be included in the trade-article layout.

27. The system of claim 15, wherein the trade article includes a trade idea.

28. A method comprising:
receiving, by a computing device, a plurality of strategy parameters defining strategy requirements with respect to one or more financial assets;
automatically determining, by the computing device, at least one trade based on the strategy parameters, the strategy parameters include at least one parameter selected from the group consisting of a base currency, a strategy currency, a strategy interest rate, a strategy asset, an expiration date, a notional amount, a maximal allowed cost of the trade, and a maximal allowed loss resulting from the trade;
determining, by the computing device trade information defining the trade, the trade information including a plurality of values of one or more trade-related parameters defining the trade with respect to at least one financial instrument; and
automatically generating a customized electronic trade article corresponding to the trade based on a predefined trade-article layout, wherein the trade-article layout defines one or more sections to include one or more respective content elements;
wherein the automatically generating comprises:
based on the trade information, automatically selecting, for at least one of the sections, a predefined content element to be included in the section from a plurality of predefined content elements corresponding to the section; and
generating the customized electronic trade article including the at least one selected content element.

29. The method of claim 28, wherein the plurality of predefined content elements correspond to a respective plurality of trade scenarios, each trade scenario including a different combination of one or more attributes selected from one or more predefined sets of attribute types.

30. The method of claim 28, wherein the at least one trade includes a structured trade including a plurality of trades with respect to a plurality of instruments, and wherein the automatically selected comprises automatically selecting the content element to be included within the section based on one or more attributes of the structured trade.

31. The method of claim 28, wherein the plurality of sections include at least one section selected from the group consisting of an outline section including an outline of the trade; a pricing section including one or more pricing parameters of the trade; an advantages section describing one or more advantages of the trade; a disadvantages section describing one or more disadvantages of the trade; at least one chart section including one or more charts corresponding to the trade; a disclaimer section including one or more disclaimers; and a summary section including a summary of the trade.

* * * * *